US012791399B2

(12) United States Patent
Magee et al.

(10) Patent No.: US 12,791,399 B2
(45) Date of Patent: Nov. 10, 2026

(54) METHODS AND APPARATUS TO REGULATE A TEMPERATURE OF A TRANSDUCER

(71) Applicant: Texas Instruments Incorporated, Dallas, TX (US)

(72) Inventors: David P Magee, Allen, TX (US); James Kelly Griffin, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 294 days.

(21) Appl. No.: 18/385,847

(22) Filed: Oct. 31, 2023

(65) Prior Publication Data

US 2024/0201023 A1 Jun. 20, 2024

Related U.S. Application Data

(60) Provisional application No. 63/433,498, filed on Dec. 19, 2022.

(51) Int. Cl.
*G01K 7/01* (2006.01)

(52) U.S. Cl.
CPC .................................... *G01K 7/01* (2013.01)

(58) Field of Classification Search
None
See application file for complete search history.

(56) References Cited

U.S. PATENT DOCUMENTS

| | | | | |
|---|---|---|---|---|
| 10,663,418 | B2 | 5/2020 | Magee et al. | |
| 11,366,076 | B2 | 6/2022 | Magee et al. | |
| 2018/0243804 | A1* | 8/2018 | Magee | B08B 7/028 |
| 2020/0282435 | A1 | 9/2020 | Magee | |
| 2021/0084199 | A1 | 3/2021 | Kishi et al. | |
| 2022/0080458 | A1* | 3/2022 | Palit | G01H 11/08 |

OTHER PUBLICATIONS

International Search Report for PCT/US2023/084505, dated Mar. 26, 2024.

* cited by examiner

*Primary Examiner* — Adam R Mott
(74) *Attorney, Agent, or Firm* — Xianghui Huang; Frank D. Cimino

(57) ABSTRACT

An example apparatus includes: machine-readable instructions; and programmable circuitry configured to at least one of instantiate or execute the machine-readable instructions to: receive burst excitation information including a burst start frequency, a burst stop frequency, and a burst duration, the burst start frequency and the burst stop frequency defining a range of frequencies of the burst excitation information; generate first and second sub burst excitation information based on the burst excitation information, the first and second sub burst excitation information including a sub burst duration based on the burst duration, a temperature sense interval, and a temperature sense duration, the temperature sense interval being a time between temperature measurements, the temperature sense duration being a time of a temperature measurement; and generate an excitation signal responsive to the first and second sub burst excitation information and temperature measurements, the excitation signal having frequencies of the range of frequencies.

19 Claims, 12 Drawing Sheets

METHODS AND APPARATUS TO REGULATE A TEMPERATURE OF A TRANSDUCER

CROSS-REFERENCE TO RELATED APPLICATION

This patent application claims the benefit of and priority to U.S. Provisional Patent Application Ser. No. 63/433,498 filed Dec. 19, 2022, which is hereby incorporated herein by reference in its entirety.

TECHNICAL FIELD

This description relates generally to temperature regulation and, more particularly, to methods and apparatus to regulate a temperature of a transducer.

BACKGROUND

A transducer is an electrical component capable of converting electrical energy into mechanical energy and vice versa. In some uses, regulator circuitry supplies an electrical signal having a frequency and amplitude to excite a transducer resulting in the transducer vibrating and generating heat. For example, a transducer may be coupled to a lens cover for a camera to vibrate the lens cover to remove contaminants from obstructing a field of view of the camera. In another example, the transducer may be coupled to a lens cover of a camera so that the transducer acts as a heat source for melting ice that obstructs a field of view of the camera.

SUMMARY

For methods and apparatus to regulate a temperature of a transducer, an example apparatus includes machine-readable instructions; and programmable circuitry configured to at least one of instantiate or execute the machine-readable instructions to: receive burst excitation information including a burst start frequency, a burst stop frequency, and a burst duration, the burst start frequency and the burst stop frequency defining a range of frequencies of the burst excitation information; generate first and second sub burst excitation information based on the burst excitation information, the first and second sub burst excitation information including a sub burst duration based on the burst duration, a temperature sense interval, and a temperature sense duration, the temperature sense interval being a time between temperature measurements, the temperature sense duration being a time of a temperature measurement; and generate an excitation signal responsive to the first and second sub burst excitation information and temperature measurements, the excitation signal having frequencies of the range of frequencies.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
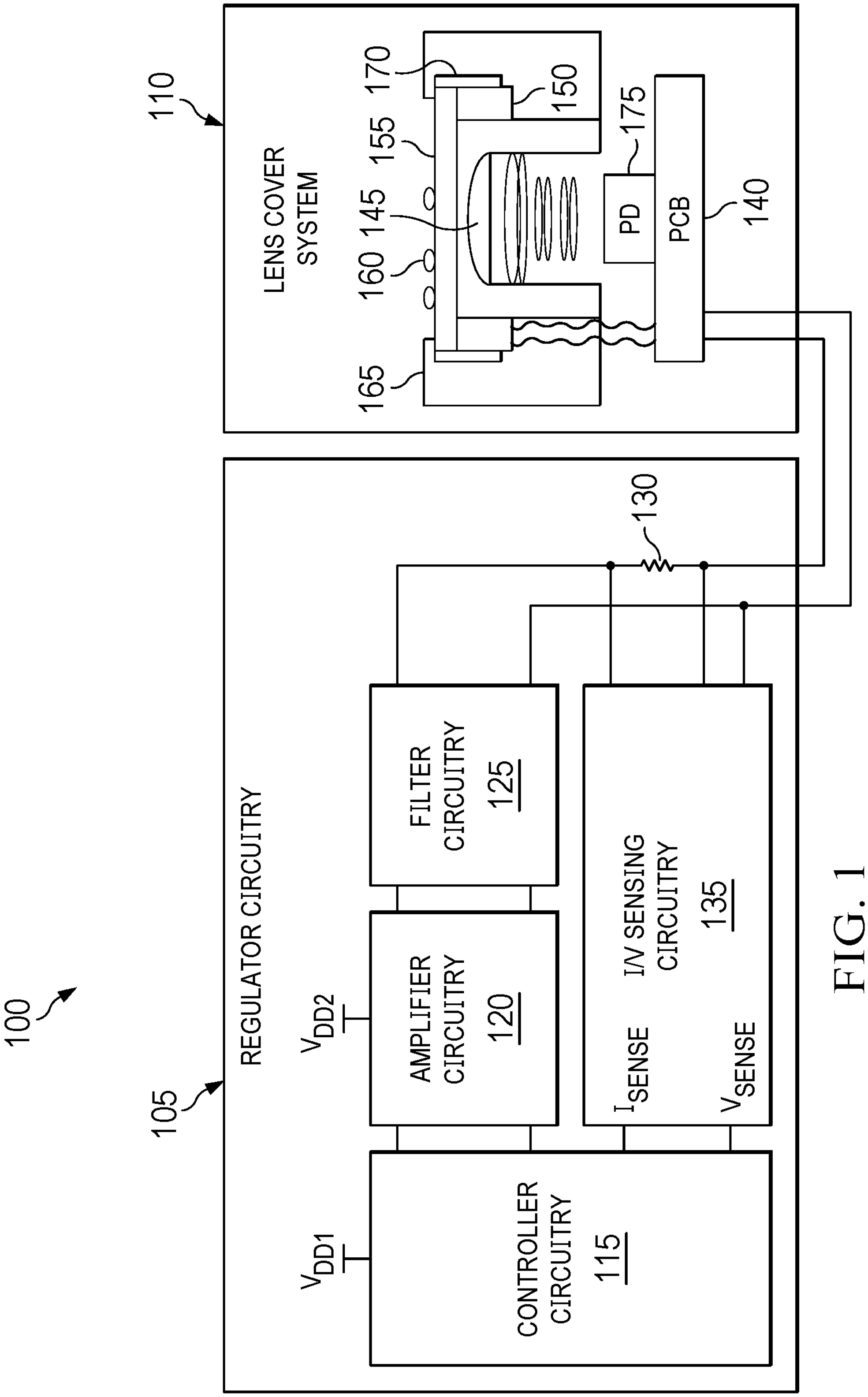
FIG. 1 is a block diagram of an example lens cleaning system including example regulator circuitry having example controller circuitry, example amplifier circuitry, example filter circuitry, and example sensing circuitry, and an example lens cover system having a transducer.

The drawings described herein are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

A transducer is a component capable of converting electrical energy into mechanical energy and vice versa. In some uses, regulator circuitry supplies an electrical signal having a frequency and amplitude to a transducer. The frequency and amplitude of the electrical signal are selected to supply power to the transducer. The transducer vibrates and generates heat responsive to the electrical signal. Such electrical signals are referred to as excitation signals.

A transducer may be mechanically coupled to a medium (e.g., a plastic cover, a glass panel, etc.) to transfer physical vibrations and/or heat to the medium. As transducer technologies and methods of manufacture advance, transducer technologies are becoming increasingly complex. For example, a transducer may be coupled to a camera lens or camera lens cover to vibrate the camera lens cover to remove contaminants obstructing a field of view of a camera. In another example, the transducer may be coupled to a camera lens or camera lens cover as a heat source capable of melting ice that obstructs a field of view of the camera.

Manufactures create piezo-electric transducers by heating a material to a temperature approximately equal to or greater than a Curie temperature of the piezo material. The Curie temperature of the material is a temperature at which any magnetic charge of the material may be replaced with an induced magnetic charge. Once at the Curie temperature, manufacturers expose the material to an induced magnetic charge. The induced magnetic charge polarizes the material, which creates the transducer. Some manufacturers use materials that include relatively low Curie temperatures to decrease manufacturing complexity. Other manufacturers use materials that have known piezoelectric properties to decrease manufacturing complexity.

However, the material of the transducer may begin to depolarize responsive to heating the transducer to excessive temperatures (e.g., temperatures near and/or greater than approximately half of the Curie temperature). Once the material begins to depolarize, the transducer no longer vibrates responsive to an electrical signal. In some examples, supplying an excitation signal to the transducer for a relatively long duration of time (e.g., one or more seconds) may result in generation of excessive heat. Such excessive heat is capable of depolarizing the material of the transducer. In such examples, environmental conditions may further reduce an amount of time needed to generate such excessive heat.

Example methods and apparatus to regulate a temperature of a transducer are described herein including regulator circuitry. The regulator circuitry sequences a supply of an excitation signal to a transducer to include temperature measurements. In some described examples, the regulator circuitry generates an excitation signal responsive to controller circuitry generating excitation information. The excitation information includes data specifying an amplitude, one or more frequencies, a phase, and a duration of a desired excitation signal. Some circuitry generates burst excitation information to perform various functions. For example, the controller circuitry generates an excitation signal specific for cleaning operations responsive to burst excitation information from cleaning circuitry. The burst excitation information includes data specifying an amplitude, a burst start frequency, a burst stop frequency, a step size, a phase, and a burst duration. The controller circuitry includes sweep circuitry to generate a sinusoidal waveform representing the excitation signal responsive to the burst excitation information. In such examples, the sweep circuitry varies the frequency of the excitation signal from the start frequency to the stop frequency in increments of the step size across the burst duration.

The sweep circuitry includes sequencing circuitry and temperature regulation circuitry which regulate the temperature of the transducer. In some examples, the sequencing circuitry separates the burst excitation information into a plurality of sub burst excitation information. The temperature regulation circuitry performs temperature measurements between a supply of each of the plurality of sub burst excitation information. The temperature regulation circuitry prevents a supply of a subsequent one of the plurality of sub burst excitation information responsive to determining an excessive temperature of a transducer. An excessive temperature of the transducer is a temperature approaching a temperature that depolarizes the transducer, such as approximately half the Curie temperature. Advantageously, the sequencing circuitry and the temperature regulation circuitry regulate generation of the excitation signal to reduce a likelihood of depolarizing the transducer.

FIG. 1 is a block diagram of an example lens cleaning system 100 including example regulator circuitry 105 and an example lens cover system 110. In the example of FIG. 1, the regulator circuitry 105 includes example controller circuitry 115, example amplifier circuitry 120, example filter circuitry 125, an example sense resistor 130, and example current and voltage (I/V) sensing circuitry 135. In the example of FIG. 1, the lens cover system 110 includes an example printed circuit board (PCB) 140, an example camera lens 145, an example transducer 150, an example lens cover 155, example contaminants 160, an example housing 165, and an example seal 170.

The regulator circuitry 105 has a first and second terminal coupled to the lens cover system 110. The regulator circuitry 105 supplies power to the lens cover system 110 by generating an excitation signal. The regulator circuitry 105 monitors power supplied to the lens cover system 110 responsive to characteristics of the excitation signal. In some examples, the regulator circuitry 105 determines characteristics of the lens cover system 110 based on the characteristics of the excitation signal. Such examples are described in further detail below. The regulator circuitry 105 may modify a frequency, phase, and/or amplitude of the excitation signal to modify the power supplied to the lens cover system 110. The regulator circuitry 105 may modify the excitation signal to increase the power efficiency, determine an impedance of the transducer 150, account for variations in an impedance of the lens cover system 110, modify power consumed by the lens cover system 110, determine a temperature of the lens cover system 110, etc.

The lens cover system 110 has first and second terminals coupled to the regulator circuitry 105. The lens cover system 110 receives the excitation signal from the regulator circuitry 105. The lens cover system 110 removes the contaminants 160 responsive to supplying the excitation signal to the transducer 150. In example operation, the regulator circuitry 105 vibrates the lens cover 155 responsive to supplying the excitation signal to the transducer 150. In such examples, the lens cover system 110 uses vibrations to remove the contaminants 160 which provides the camera lens 145 a clear field of view. Advantageously, the lens cover system 110 prevents the contaminants 160 from obstructing the field of view of the camera lens 145.

The controller circuitry 115 has first and second inputs coupled to the I/V sensing circuitry 135 and first and second outputs coupled to the amplifier circuitry 120. The controller circuitry 115 generates a pre-amplifier signal representing a desired excitation signal. In some examples, the pre-amplifier signal is a pulse width modulation (PWM) signal. In such examples, the controller circuitry 115 uses modulation techniques to generate the PWM signal based on a sinusoidal waveform representing a relatively lower power version of the excitation signal. In other examples, the controller circuitry 115 generates the pre-amplifier signal as the relatively lower power version of the excitation signal. In such examples, the frequency of the pre-amplifier signal is approximately equal to the frequency of the excitation signal, while the amplitude of the pre-amplifier signal is proportional to the amplitude of the excitation signal. The controller circuitry 115 supplies the pre-amplifier signal to the amplifier circuitry 120.

The controller circuitry 115 receives a sense current ($I_{SENSE}$) and a sense voltage ($V_{SENSE}$) from the I/V sensing circuitry 135 responsive to supplying the pre-amplifier signal to the amplifier circuitry 120. The controller circuitry 115 determines a plurality of the sense currents and voltages across a duration of time that the excitation signal is being supplied to the lens cover system 110. The controller circuitry 115 determines an impedance of the lens cover system 110 responsive to the plurality of sense current and voltages. The controller circuitry 115 determines characteristics of the lens cover system based on the determined impedance and the characteristics of the excitation signal being supplied. In some examples, the controller circuitry 115 detects modifications to the contaminants 160 responsive to changes in the determined impedance. In other examples, the controller circuitry 115 determines a temperature of the transducer 150 responsive to the determined impedance. Such operations of the controller circuitry 115 are further described below in connection with FIG. 3.

In some examples, the controller circuitry 115 modifies the characteristics of the excitation signal responsive to the determined impedance. In such examples, the controller circuitry 115 may increase power efficiency by modifying the excitation signal specific to the impedance of the lens cover system 110. In other examples, the controller circuitry 115 modifies the characteristics of the excitation signal to perform a variety of operations. For example, an excitation signal may have a specific amplitude, frequency, phase, duration responsive to the controller circuitry 115 performing a cleaning operation. Advantageously, the controller circuitry 115 may determine characteristics, such as impedance, of the lens cover system 110 using the sense current and voltage from the I/V sensing circuitry 135. Advantageously, the controller circuitry 115 may modify characteristics of the pre-amplifier signal to modify characteristics of the excitation signal responsive to the determined characteristics.

The amplifier circuitry 120 has first and second inputs coupled to the controller circuitry 115 and first and second outputs coupled to the filter circuitry 125. The amplifier circuitry 120 receives the pre-amplifier signal from the controller circuitry 115. The amplifier circuitry 120 amplifies the pre-amplifier signal to generate a relatively higher power signal. In some examples, when the pre-amplifier signal is a PWM signal, the relatively higher power signal is a PWM signal of a relatively higher voltage level. For example, a logical one of the pre-amplifier signal is three volts (V), while a logical one of the relatively higher power signal is fifty volts. In other examples, when the pre-amplifier signal is a sinusoidal waveform, the relatively higher power signal is a sinusoidal waveform of approximately the same frequency and phase of the pre-amplifier signal. However, the amplitude of the relatively higher power signal is an amplified version of the pre-amplifier signal. For example, the pre-amplifier signal may have an amplitude of two volts, while the relatively higher power signal has an amplitude of one-hundred volts.

In example operation, the controller circuitry 115 may operate in a first power domain while the amplifier circuitry 120 operates in the second power domain. Such a differentiation of power domains may decrease the cost of the controller circuitry 115 while the amplifier circuitry 120 remains capable of supplying a relatively higher power signal. The amplifier circuitry 120 supplies the relatively higher power signal to the filter circuitry 125. Advantageously, the amplifier circuitry 120 allows for generation of an excitation signal having a voltage greater than voltages of the controller circuitry 115.

Figure 6:
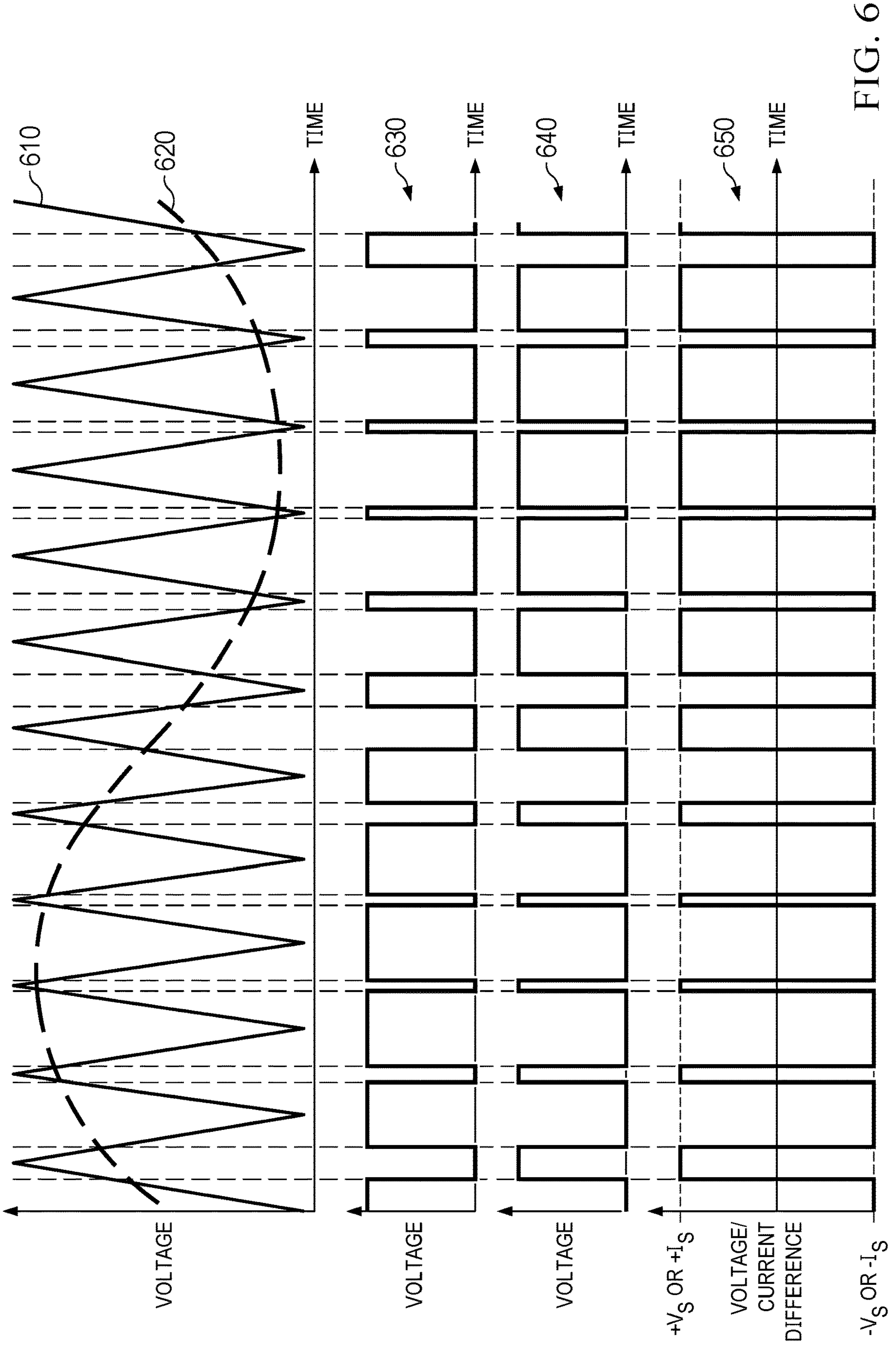
FIG. 6 is an example timing diagram of example operations of the controller circuitry of FIGS. 1 and 3, the amplifier circuitry of FIGS. 1 and 2, and the filter circuitry of FIGS. 1 and 2.

The filter circuitry 125 has first and second inputs coupled to the amplifier circuitry 120 and first and second outputs coupled to lens cover system 110 and the I/V sensing circuitry 135. The filter circuitry 125 receives the relatively higher power signal from the amplifier circuitry 120. The filter circuitry 125 filters the relatively higher power signal to generate the excitation signal. In some examples, such as when the pre-amplifier signal is a PWM signal, the filter circuitry 125 averages relatively high-speed duty cycles of the relatively higher power signal to generate the excitation signal as a sinusoidal waveform. Such an example operation is illustrated in FIG. 6 and further described below. In other examples, such as when the pre-amplifier signal is sinusoidal, the filter circuitry 125 removes frequencies greater than a cut-off frequency from the relatively higher power signal. The filter circuitry 125 supplies the excitation signal to the lens cover system 110. Alternatively, the filter circuitry 125 may be modified and/or removed from the regulator circuitry 105 based on the amplifier circuitry 120. For example, when the amplifier circuitry 120 is a Class D amplifier, the regulator circuitry 105 needs the filter circuitry 125 to convert the PWM signal to a sinusoidal excitation signal. However, if the amplifier circuitry 120 is a linear amplifier and the pre-amplifier signal is a sinusoidal signal, the filter circuitry 125 may not be needed.

The I/V sensing circuitry 135 has first, second, and third inputs coupled to the lens cover system 110, the filter circuitry 125, and the sense resistor 130. The I/V sensing circuitry 135 has a first and second output coupled to the controller circuitry 115. The I/V sensing circuitry 135 receives a reference voltage as the voltage difference across the sense resistor 130. The I/V sensing circuitry 135 receives an excitation voltage as a voltage of the excitation signal from the filter circuitry 125. The I/V sensing circuitry 135 converts the reference voltage and the excitation voltage from the power domain of the amplifier circuitry 120 to the power domain of the controller circuitry 115. In some examples, the I/V sensing circuitry 135 divides the reference voltage and/or the excitation voltage to step-down the voltages to the power domain of the controller circuitry 115.

The I/V sensing circuitry 135 generates the sense current and sense voltage as single ended versions of the differentially sensed reference and excitation voltages. The I/V sensing circuitry generates the single ended voltages in the power domain of the controller circuitry 115. In some examples, the I/V sensing circuitry 135 generates the sense current and voltage in reference to a common potential (e.g., ground). The voltage of the sense current is proportional to the voltage difference across the sense resistor 130. Advantageously, the voltage of the sense current represents the current of the excitation signal. The voltage of the sense voltage is proportional to the voltage of the excitation signal. Advantageously, the voltage of the sense voltage represents the voltage of the excitation signal. The I/V sensing circuitry 135 supplies the sense current and voltage to the controller circuitry 115.

The PCB 140 is coupled to the regulator circuitry 105 and the transducer 150. The PCB 140 includes a photo diode (PD) 175 that converts an optical input to an electrical signal. The photo diode 175 may capture images of the field of view of the camera lens 145. The PCB 140 couples the transducer 150 to the output of the filter circuitry 125. Alternatively, the transducer 150 may be directly coupled to the output of the filter circuitry 125 or the amplifier circuitry 120.

The camera lens 145 is coupled to the photo diode 175. The camera lens 145 supplies optical light to the photo diode 175. In some examples, the camera lens 145 increases the field of view of the photo diode 175 using optical techniques. The camera lens 145 may include a plurality of lenses to focus and/or modulate light towards the photo diode 175. In some examples, the camera lens 145 and the photo diode 175 form a camera system.

The transducer 150 is coupled to the lens cover 155, the housing 165, and the seal 170. Alternatively, the transducer 150 may be coupled directly to the camera lens 145, the housing 165 and the seal 170. The transducer 150 receives the excitation signal from the regulator circuitry 105. The transducer 150 converts power, supplied by the excitation signal, to mechanical motions in the form of physical vibrations. The lens cover 155 and/or the camera lens 145 vibrate responsive to the mechanical motions of the transducer 150. The contaminants 160 move responsive to the physical vibrations of the transducer 150. In some examples, the transducer 150 is a piezoelectric component.

Modifying characteristics of the excitation signal allows the regulator circuitry 105 to control the mechanical motions of the transducer 150. The regulator circuitry 105 may generate excitation signals have a wide range of characteristics to remove the contaminants 160 from the lens cover 155. During example operations, an impedance of the transducer 150 may vary as the contaminants 160 are removed from and/or as additional contaminants are added to the lens cover 155. For example, the camera cover system 110 implemented in a vehicle may cause the lens cover 155 to be exposed to additional contaminants as the vehicle is in motion. In such an example, the regulator circuitry 105 may modify the power supplied to the camera cover system 110 as the impedance of the transducer 150 varies. The regulator circuitry 105 determines the changes in the impedance responsive to sense currents and voltages of the excitation signal.

In example operations, excessive thermal accumulation is responsive to the transducer 150 consuming power. In such examples, thermal accumulation increases a temperature of the transducer 150. The impedance of the transducer 150 varies as the temperature of the transducer 150 changes. Advantageously, changes the impedance of the transducer 150 is temperature dependent. The regulator circuitry 105 may detect increases in temperatures of the transducer 150 responsive to variations of the impedance.

The housing 165 is coupled to the seal 170. The housing 165 houses the transducer 150 and the lens cover 155, such that the PCB 140, the camera lens 145, and the photo diode 175 are protected from exposure to the contaminants 160. The seal 170 is coupled between the housing 165 and transducer 150 and between the housing 165 and the lens cover 155. The seal 170 prevents the contaminants 160 from reaching the camera lens 145 and/or the photo diode 175.

Figure 2:
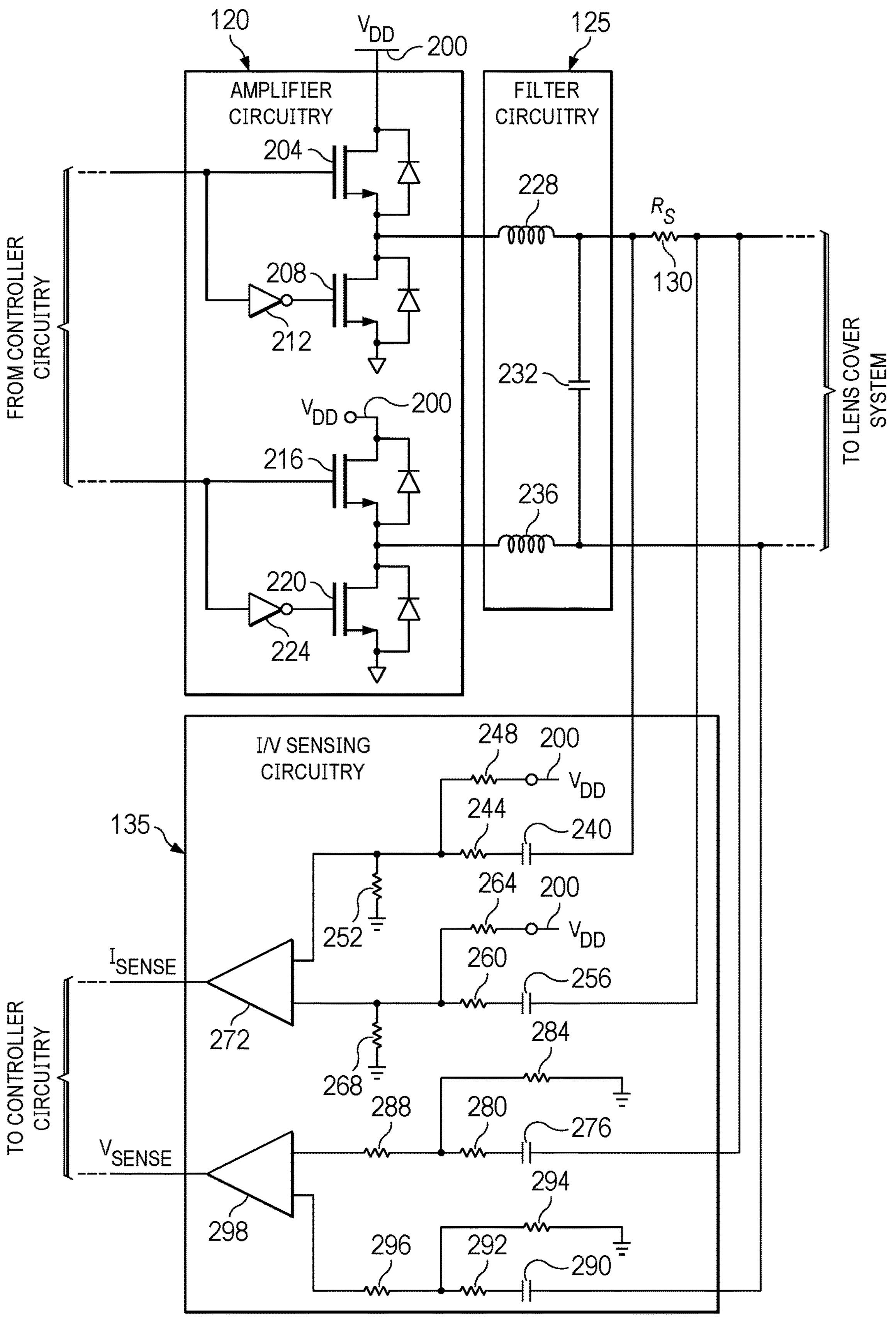
FIG. 2 is a schematic diagram of examples of the amplifier circuitry of FIG. 1, the filter circuitry of FIG. 1, and the sensing circuitry of FIG. 1.

FIG. 2 is a schematic diagram of examples of the amplifier circuitry 120 of FIG. 1, the filter circuitry 125 of FIG. 1, the sense resistor 130 of FIG. 1, and the I/V sensing circuitry 135 of FIG. 1. The amplifier circuitry 120 and the I/V sensing circuitry 135 may be coupled to the controller circuitry 115 of FIG. 1. The filter circuitry 125, the sense resistor 130, and the I/V sensing circuitry 135 may be coupled to the lens cover system 110 of FIG. 1.

The amplifier 120 has first and second inputs coupled to the controller circuitry 115 and first and second outputs coupled to the filter circuitry 125. In the example of FIG. 2, the amplifier circuitry 120 includes an example supply terminal 200, a first example transistor 204, a second example transistor 208, a first example inverter 212, a third example transistor 216, a fourth example transistor 220, and a second example inverter 224. The amplifier circuitry 120 receives a differential pair of pre-amplifier signals which represent the pre-amplifier signal. In the example of FIG. 2, the differential pair of pre-amplifier signals are PWM signals that have a varying duty cycle which represent a sinusoidal excitation signal. In such examples, the amplifier circuitry 120 amplifies voltages of the differential pair of pre-amplifier signals to generate a differential pair of relatively higher power signals which represent the excitation signal as a PWM signal. The amplifier circuitry 120 supplies the differential pair of relatively higher power signals to the filter circuitry 125. In the example of FIG. 2, the amplifier circuitry 120 is a class D amplifier. However, with slight modifications, the amplifier circuitry 120 may be an alternative class of amplifier circuitry, such as a class A amplifier, a class AB amplifier, etc.

The filter circuitry 125 has first and second inputs coupled to the amplifier circuitry 120 and first and second outputs coupled to the I/V sensing circuitry 135, the sense resistor 130, and that may be coupled to the lens cover system 110. In the example of FIG. 2, the filter circuitry 125 includes a first example inductor 228, a first example capacitor 232, and a second example inductor 236. The filter circuitry 125 receives the differential pair of relatively higher power signals. The filter circuitry 125 generates a differential pair of excitation signals based on the relatively higher power signals. In the example of FIG. 2, the filter circuitry 125 generates the differential pair of excitation signals by averaging currents through the inductors 228, 236 based on the varying duty cycles of the differential pair of relatively higher power signals. In such examples, the filter circuitry 125 filters the differential pair of relatively higher power signals to generate the differential pair of excitation signals as sinusoidal signals. In examples where the amplifier circuitry 120 is not class D amplifier circuitry, the filter circuitry 125 may filter frequencies of the differential pair of relatively higher power signals to reduce noise and/or increase noise immunity. In such examples, the pre-amplifier signal and the relatively higher power signal are sinusoidal signals.

The I/V sensing circuitry 135 has first, second, and third inputs coupled to the filter circuitry 125, the sense resistor 130, and that may be coupled to the lens cover system 110. The I/V sensing circuitry 135 has first and second outputs that may be coupled to the controller circuitry 115. In the example of FIG. 2, the I/V sensing circuitry 135 includes the supply terminal 200, a second example capacitor 240, a first example resistor 244, a second example resistor 248, a third example resistor 252, a third example capacitor 256, a fourth example resistor 260, a fifth example resistor 264, a sixth example resistor 268, a first example amplifier 272, a fourth example capacitor 276, a seventh example resistor 280, an eighth example resistor 284, a ninth example resistor 288, a fifth example capacitor 290, a tenth example resistor 292, an eleventh example resistor 294, a twelfth example resistor 296, and a second example amplifier 298.

The I/V sensing circuitry 135 receives the differential pair of excitation signals and the reference voltage of the sense resistor 130. The I/V sensing circuitry 135 steps down a voltage of the reference voltage to a logic level of the controller circuitry 115 and generates a single ended voltage representing a sense current. The voltage of the sense current is proportional to the current of the differential pair of excitation signals. The I/V sensing circuitry 135 steps down a voltage of the differential pair of excitation signals to a logic level of the controller circuitry 115 and generates a single ended voltage representing the sense voltage. The voltage of the sense voltage is proportional to a voltage of the differential pair of excitation signals. The I/V sensing circuitry 135 supplies the sense current and voltage to the controller circuitry 115.

The supply terminal 200 is coupled to the transistors 204, 216 and the resistors 248, 264. The supply terminal 200 supplies a supply voltage ($V_{DD}$) from power supply circuitry. In some examples, the power supply circuitry is internal to the regulator circuitry 105. In other examples, the power supply circuitry is external to the regulator circuitry 105. The supply voltage is a fixed reference voltage that supplies power to the amplifier circuitry 120 and the I/V sensing circuitry 135.

The first transistor 204 has a first terminal coupled to the supply terminal 200 and a second terminal coupled to the second transistor 208 and the first inductor 228. The first transistor 204 has a control terminal coupled to the first inverter 212 and may be coupled to the controller circuitry 115. The first transistor 204 receives a first pre-amplifier signal of the differential pair of pre-amplifier signals. The first pre-amplifier signal is a PWM signal that controls the first transistor 204. When enabled (e.g., turned on, conducting), the first transistor 204 supplies current from the supply terminal 200 to the first inductor 228, which sets a voltage of the first inductor 228 approximately equal to the supply voltage. When disabled (e.g., turned off, non-conducting), the first transistor 204 prevents the supply of current from the supply terminal 200 to the first inductor 228.

The second transistor 208 has a first terminal coupled to the first transistor 204 and the first inductor 228 and a second terminal coupled to a common terminal, which supplies a common potential (e.g., ground). The second transistor 208 has a control terminal coupled to the first inverter 212. The second transistor 208 receives a first inverted pre-amplifier signal from the first inverter 212. The first inverted pre-amplifier signal is a PWM signal that controls the second transistor 208. In the example of FIG. 2, the first inverted pre-amplifier signal is approximately an inverted version of the first pre-amplifier signal. When enabled, the second transistor 208 supplies current to the common terminal from the first inductor 228, which sets the voltage of the first inductor 228 approximately equal to the common potential. When disabled, the second transistor 208 prevents the supply of current to the common terminal from the first inductor 228.

The first inverter 212 has a first terminal coupled to the first transistor 204 and may be coupled to the controller circuitry 115 and a second terminal coupled to the second transistor 208. The first inverter 212 receives the first pre-amplifier signal. The first inverter 212 generates the first inverted pre-amplifier signal by inverting the first pre-amplifier signal. The first inverter 212 supplies the first inverted pre-amplifier signal to the second transistor 208.

The transistors 204, 208 generate a first relatively higher power signal of the differential pair of high-power signals based on the first pre-amplifier signal and the first inverted pre-amplifier signal. In example operations, the first relatively higher power signal is approximately equal to the supply voltage of the supply terminal 200 responsive to first the pre-amplifier signal being a first logic state (e.g., a logic one/a logical high, or a logic zero/a logical low). In such example operations, the first relatively higher power signal is approximately equal to the common potential of the common terminal responsive to the first pre-amplifier signal being a second logic state (e.g., a logic zero/a logical low or a logic one/a logical high). The transistors 204, 208 supply the first relatively higher power signal to the first inductor 228. Advantageously, the transistors 204, 208 generate the first relatively higher power signal by increasing a voltage of the first pre-amplifier signal. The first pre-amplifier signal fully enables/disables the transistors 204, 208. Advantageously, using a PWM signal as the first pre-amplifier signal increases a power efficiency of the transistors 204, 208 by decreasing linear operations of the transistors 204, 208.

The third transistor 216 has a first terminal coupled to the supply terminal 200 and a second terminal coupled to the fourth transistor 220 and the second inductor 236. The third transistor 216 has a control terminal coupled to the second inverter 224 and may be coupled to the controller circuitry 115. The third transistor 216 receives a second pre-amplifier signal of the differential pair of pre-amplifier signals. The second pre-amplifier signal is a PWM signal that controls the third transistor 216. In some examples, the second pre-amplifier signal is approximately equal to an inverted version of the first pre-amplifier signal. In such examples, the pre-amplifier signal is approximately equal to a difference between the first and second pre-amplifier signal. Such pre-amplifier signals form the differential pair of pre-amplifier signals. When enabled, the third transistor 216 supplies current from the supply terminal 200 to the second inductor 236, which sets a voltage of the second inductor 236 approximately equal to the supply voltage. When disabled, the third transistor 216 prevents the supply of current from the supply terminal 200 to the second inductor 236.

The fourth transistor 220 has a first terminal coupled to the third transistor 216 and the second inductor 236 and a second terminal coupled to the common terminal. The fourth transistor 220 has a control terminal coupled to the second inverter 224. The fourth transistor 220 receives a second inverted pre-amplifier signal from the second inverter 224. The second inverted pre-amplifier signal is a PWM signal that controls the fourth transistor 220. When enabled, the fourth transistor 220 supplies current to the common terminal from the second inductor 236, which sets the voltage of the second inductor 236 approximately equal to the common potential. When disabled, the fourth transistor 220 prevents the supply of current to the common terminal from the second inductor 236.

The second inverter 224 has a first terminal coupled to the third transistor 216 and may be coupled to the controller circuitry 115 and a second terminal coupled to the fourth transistor 220. The second inverter 224 receives the second pre-amplifier signal from the controller circuitry 115. The second inverter 224 generates the second inverted pre-amplifier signal by inverting the second pre-amplifier signal. The second inverter 224 supplies the second inverted pre-amplifier signal to the fourth transistor 220.

The transistors 216, 220 generate a second relatively higher power signal of the differential pair of high-power signals based on the second pre-amplifier signal and the second inverted pre-amplifier signal. In example operations, the second relatively higher power signal is approximately equal to the supply voltage of the supply terminal 200 responsive to the second pre-amplifier signal being a first logic state (e.g., a logic one/a logical high, or a logic zero/a logical low). In such example operations, the second relatively higher power signal is approximately equal to the common potential of the common terminal responsive to the second pre-amplifier signal being a second logic state (e.g., a logic zero/a logical low or a logic one/a logical high). The transistors 216, 220 supply the second relatively higher power signal to the second inductor 236. Advantageously, the transistors 216, 220 generate the second relatively higher power signal by increasing a voltage of the second pre-amplifier signal. The second pre-amplifier signal fully enables/disables the transistors 216, 220. Advantageously, using a PWM signal as the second pre-amplifier signal increases a power efficiency of the transistors 216, 220 by decreasing linear operations of the transistors 216, 220.

In the example of FIG. 2, internal body diodes of the transistors 204, 208, 216, 220 are illustrated. However, in other examples, the internal body diodes of the transistors 204, 208, 216, 220 may not be illustrated. In the example of FIG. 2, the transistors 204, 208, 216, 220 are n-channel metal-oxide semiconductor field-effect transistors (MOSFETs). Alternatively, the transistors 204, 208, 216, 220 may be n-channel field-effect transistor (FET), an n-channel insulated-gate bipolar transistor (IGBT), an n-channel junction field effect transistor (JFET), an NPN bipolar junction transistor (BJT) and/or, with slight modifications, a p-type equivalent device. The transistors 204, 208, 216, 220 may be depletion mode devices, drain-extended devices, enhancement mode devices, natural transistors or other type of device structure transistors. Furthermore, the transistors 204, 208, 216, 220 may be implemented in/over a silicon substrate (Si), a silicon carbide substrate (SiC), a gallium nitride substrate (GaN) or a gallium arsenide substrate (GaAs).

The first inductor 228 has a first terminal coupled to the transistors 204, 208 and a second terminal coupled to the sense resistor 130 and the capacitors 232, 240. The first inductor 228 receives the first relatively higher power signal from the transistors 204, 208. The first inductor 228 generates a first excitation signal of the differential pair of excitation signals by averaging currents of the first relatively higher power signal. The first inductor 228 converts the first relatively higher power signal having PWM characteristics and a varying duty cycle into the first excitation signal being a sinusoidal waveform. The first inductor 228 averages currents of the varying duty cycle of the first relatively higher power signal to set an amplitude of the first relatively higher power signal. The first inductor 228 supplies the first excitation signal to the sense resistor 130 and the capacitors 232, 240.

The first capacitor 232 has a first terminal coupled to the first inductor 228, the sense resistor 130, and the second capacitor 240 and a second terminal coupled to the second inductor 236, the fifth capacitor 290, and may be coupled to the lens cover system 110. The first capacitor 232 receives the differential pair of excitation signals from the inductors 228, 236. The first capacitor 232 filters relatively high frequency noise of the differential pair of excitation signals. The first capacitor 232 resists relatively high frequency changes in the difference between signals of the differential pair of excitation signals.

The second inductor 236 has a first terminal coupled to the transistors 216, 220 and a second terminal coupled to the sense resistor 130, the capacitors 232, 290, and that may be coupled to the lens cover system 110. The second inductor 236 receives the second relatively higher power signal from the transistors 216, 220. The second inductor 236 generates a second excitation signal of the differential pair of excitation signals by averaging currents of the second relatively higher power signal. The second inductor 236 converts the second relatively higher power signal having PWM characteristics and a varying duty cycle into the second excitation signal being a sinusoidal waveform. The second inductor 236 averages currents of the varying duty cycle of the second relatively higher power signal to set an amplitude of the second relatively higher power signal. The second inductor 236 supplies the second excitation signal to the lens cover system 110 and the fifth capacitor 290.

The second capacitor 240 has a first terminal coupled to the sense resistor 130, the first inductor 228, and the first capacitor 232 and a second terminal coupled to the first resistor 244. The second capacitor 240 receives the first excitation signal of the differential pair of excitation signals from the first inductor 228. The second capacitor 240 removes direct current (DC) offset and/or relatively low frequency noise from the first excitation signal. The second capacitor 240 may be referred to as a blocking capacitor. The second capacitor 240 supplies the first excitation signal to the first resistor 244.

The first resistor 244 has a first terminal coupled to the second capacitor 240 and a second terminal coupled to the resistors 248, 252 and the first amplifier 272. The first resistor 244 receives the first excitation signal from the second capacitor 240. The first resistor 244 reduces a current of the first excitation signal. The first resistor 244 may be referred to as a current limiting resistor. In some examples, the first resistor 244 stabilizes timing of a resistor-capacitor (RC) circuit formed by the resistors 248, 252 and the second capacitor 240. The first resistor 244 supplies the first excitation signal to the resistors 248, 252 and the first amplifier 272.

The second resistor 248 has a first terminal coupled to the supply terminal 200 and a second terminal coupled to the resistors 244, 252 and the first amplifier 272. The second resistor 248 receives the supply voltage from the supply terminal 200 and the first excitation signal from the first resistor 244. The second resistor 248 generates a voltage difference approximately equal to the supply voltage minus the voltage of the first excitation signal. In some examples, the second resistor 248 is a part of voltage divider circuitry. In such examples, resistance of the second resistor 248 may step down a voltage of the first excitation signal.

The third resistor 252 has a first terminal coupled to the resistors 244, 248 and the first amplifier 272 and a second terminal coupled to the common terminal. The third resistor 252 receives the first excitation signal from the first resistor 244 and the common potential from the common terminal. The third resistor 252 generates a voltage difference approximately equal to the voltage of the first excitation signal minus the voltage of the common potential. In some examples, the third resistor 252 is a part of voltage divider circuitry. In such examples, resistance of the third resistor 252 may step down a voltage of the first excitation signal.

The third capacitor 256 has a first terminal coupled to the sense resistor 130 and may be coupled to the lens cover system 110 and a second terminal coupled to the resistor 260. The third capacitor 256 receives a modified first excitation signal from the sense resistor 130. The modified first excitation signal is approximately equal to the first excitation signal minus the voltage difference across the sense resistor 130. The third capacitor 256 removes DC offset and/or relatively low frequency noise from the modified first excitation signal. The third capacitor 256 may be referred to as a blocking capacitor. The third capacitor 256 supplies the modified first excitation signal to the fourth resistor 260.

The fourth resistor 260 has a first terminal coupled to the third capacitor 256, the resistors 264, 268, and the first amplifier 272. The fourth resistor 260 receives the modified first excitation signal from the third capacitor 256. The fourth resistor 260 reduces a current of the modified first excitation signal. The fourth resistor 260 may be referred to as a current limiting resistor. In some examples, the fourth resistor 260 stabilizes timing of an RC circuit formed by the resistors 264, 268 and the third capacitor 256. The fourth resistor 260 supplies the modified first excitation signal to the resistors 264, 268 and the first amplifier 272.

The fifth resistor 264 has a first terminal coupled to the supply terminal 200 and a second terminal coupled to the resistors 260, 268 and the first amplifier 272. The fifth resistor 264 receives the supply voltage from the supply terminal 200 and the modified first excitation signal from the fourth resistor 260. The fifth resistor 264 generates a voltage difference approximately equal to the supply voltage minus the voltage of the modified first excitation signal. In some examples, the fifth resistor 264 is a part of voltage divider circuitry. In such examples, resistance of the fifth resistor 264 may step down a voltage of the modified first excitation signal.

The sixth resistor 268 has a first terminal coupled to the resistors 260, 264 and the first amplifier 272 and a second terminal coupled to the common potential. The sixth resistor 268 receives the modified first excitation signal from the fourth resistor 260 and the common potential from the common terminal. The sixth resistor 268 generates a voltage difference approximately equal to the voltage of the modified first excitation signal minus the voltage of the common potential. In some examples, the sixth resistor 268 is a part of voltage divider circuitry. In such examples, resistance of the sixth resistor 268 may step down a voltage of the modified first excitation signal.

The first amplifier 272 has a first input coupled to the resistors 244, 248, 252 and a second input coupled to the resistors 260, 264, 268. The first amplifier 272 has an output that may be coupled to the controller circuitry 115. The resistors 244, 248, 252 set a voltage of the first input of the first amplifier 272 proportionally to the first excitation signal. The resistors 260, 264, 268 set a voltage of the second input of the first amplifier 272 proportionally to the modified first excitation signal. The first amplifier 272 sets the voltage of the sense current based on the difference between voltages of the first and second inputs. In example operations, the voltage of the sense current is proportional to the voltage difference across the sense resistor 130. In such examples, the current of the first excitation signal is approximately equal to the voltage of the sense current divided by a resistance of the sense resistor 130. The resistors 244, 248, 252, 260, 264, 268 may step down the voltages at the inputs of the first amplifier 272 to decrease a magnitude of the voltage difference across the sense resistor 130. In such examples, the controller circuitry 115 may determine the voltage of the sense current responsive to stepping down the voltage. The first amplifier 272 supplies the sense current to the controller circuitry 115.

The fourth capacitor 276 has a first terminal coupled to the sense resistor 130 and may be coupled to the lens cover system 110 and a second terminal coupled to the seventh resistor 280. The fourth capacitor 276 receives the modified first excitation signal from the sense resistor 130. The fourth capacitor 276 removes DC offset and/or relatively low frequency noise from the modified first excitation signal. The fourth capacitor 276 may be referred to as a blocking capacitor. The fourth capacitor 276 supplies the modified first excitation signal to the seventh resistor 280.

The seventh resistor 280 has a first terminal coupled to the fourth capacitor 276 and a second terminal coupled to the resistors 284, 288. The seventh resistor 280 receives the modified first excitation signal from the fourth capacitor 276. The seventh resistor 280 reduces a current of the modified first excitation signal. The seventh resistor 280 may be referred to as a current limiting resistor. In some examples, the seventh resistor 280 stabilizes timing of an RC circuit formed by the resistors 284, 288 and the fourth capacitor 276. In some examples, the seventh resistor 280 is a part of voltage divider circuitry. In such examples, resistance of the seventh resistor 280 may step down a voltage of the modified first excitation signal. The seventh resistor 280 supplies the modified first excitation signal to the resistors 284, 288.

The eighth resistor 284 has a first terminal coupled to the resistors 280, 288 and a second terminal coupled to the common potential. The eighth resistor 284 receives the modified first excitation signal from the seventh resistor 280 and the common potential from the common terminal. The eighth resistor 284 generates a voltage difference approximately equal to the voltage of the modified first excitation signal minus the voltage of the common potential. In some examples, the eighth resistor 284 is a part of voltage divider circuitry. In such examples, resistance of the eighth resistor 284 may step down a voltage of the modified first excitation signal.

The ninth resistor 288 has a first terminal coupled to the resistors 280, 284 and a second terminal coupled to the second amplifier 298. The ninth resistor 288 receives the modified first excitation signal from the resistors 280, 284. The ninth resistor 288 may reduce a current of the modified first excitation signal. In some examples, the ninth resistor 288 is a part of voltage divider circuitry. In such examples, resistance of the ninth resistor 288 may step down a voltage of the modified first excitation signal.

The fifth capacitor 290 has a first terminal coupled to the first capacitor 232, the second inductor 236, and may be coupled to the lens cover system 110 and a second terminal coupled to the tenth resistor 292. The fifth capacitor 290 receives the second excitation signal of the differential pair of excitation signals from the second inductor 236. The fifth capacitor 290 removes DC offset and/or relatively low frequency noise from the second excitation signal. The fifth capacitor 290 may be referred to as a blocking capacitor. The fifth capacitor 290 supplies the second excitation signal to the tenth resistor 292.

The tenth resistor 292 has a first terminal coupled to the fifth capacitor 290 and a second terminal coupled to the resistors 294, 296. The tenth resistor 292 receives the second excitation signal from the fifth capacitor 290. The tenth resistor 292 reduces a current of the second excitation signal. The tenth resistor 292 may be referred to as a current limiting resistor. In some examples, the tenth resistor 292 stabilizes timing of an RC circuit formed by the resistors 294, 296 and the fifth capacitor 290. In some examples, the tenth resistor 292 is a part of voltage divider circuitry. In such examples, resistance of the tenth resistor 292 may step down a voltage of the second excitation signal. The tenth resistor 292 supplies the second excitation signal to the resistors 294, 296.

The eleventh resistor 294 has a first terminal coupled to the resistors 292, 296 and a second terminal coupled to the common terminal. The eleventh resistor 294 receives the second excitation signal from the tenth resistor 292 and the common potential from the common terminal. The eleventh resistor 294 generates a voltage difference approximately equal to the voltage of the second excitation signal minus the voltage of the common potential. In some examples, the eleventh resistor 294 is a part of voltage divider circuitry. In such examples, resistance of the eleventh resistor 294 may step down a voltage of the second excitation signal.

The twelfth resistor 296 has a first terminal coupled to the resistors 292, 294 and a second terminal coupled to the second amplifier 298. The twelfth resistor 296 receives the second excitation signal from the resistors 292, 294. The twelfth resistor 296 may reduce a current of the second excitation signal. In some examples, the twelfth resistor 296 is a part of voltage divider circuitry. In such examples, resistance of the twelfth resistor 296 may step down a voltage of the second excitation signal.

The second amplifier 298 has a first input coupled to the ninth resistor 288 and a second input coupled to the twelfth resistor 296. The second amplifier 298 has an output that may be coupled to the controller circuitry 115. The ninth resistor 288 sets a voltage of the first input of the second amplifier 298 proportionally to the modified first excitation signal. The twelfth resistor 296 sets a voltage of the second input of the second amplifier 298 proportionally to the second excitation signal. The second amplifier 298 sets the voltage of the sense voltage based on the difference between voltages of the first and second inputs. In example operations, the voltage of the sense voltage is proportional to the voltage difference between the differential pair of excitation signals. In such examples, the sense voltage is proportional to the voltage supplied to the lens cover system 110. The resistors 280, 284, 288, 292, 294, 296 may step down the voltages at the inputs of the second amplifier 298 to decrease a magnitude of the voltage difference of the differential pair of excitation signals. In such examples, the controller circuitry 115 may determine the voltage of the sense voltage responsive to stepping down the voltage. The second amplifier 298 supplies the sense voltage to the controller circuitry 115.

Figure 3:
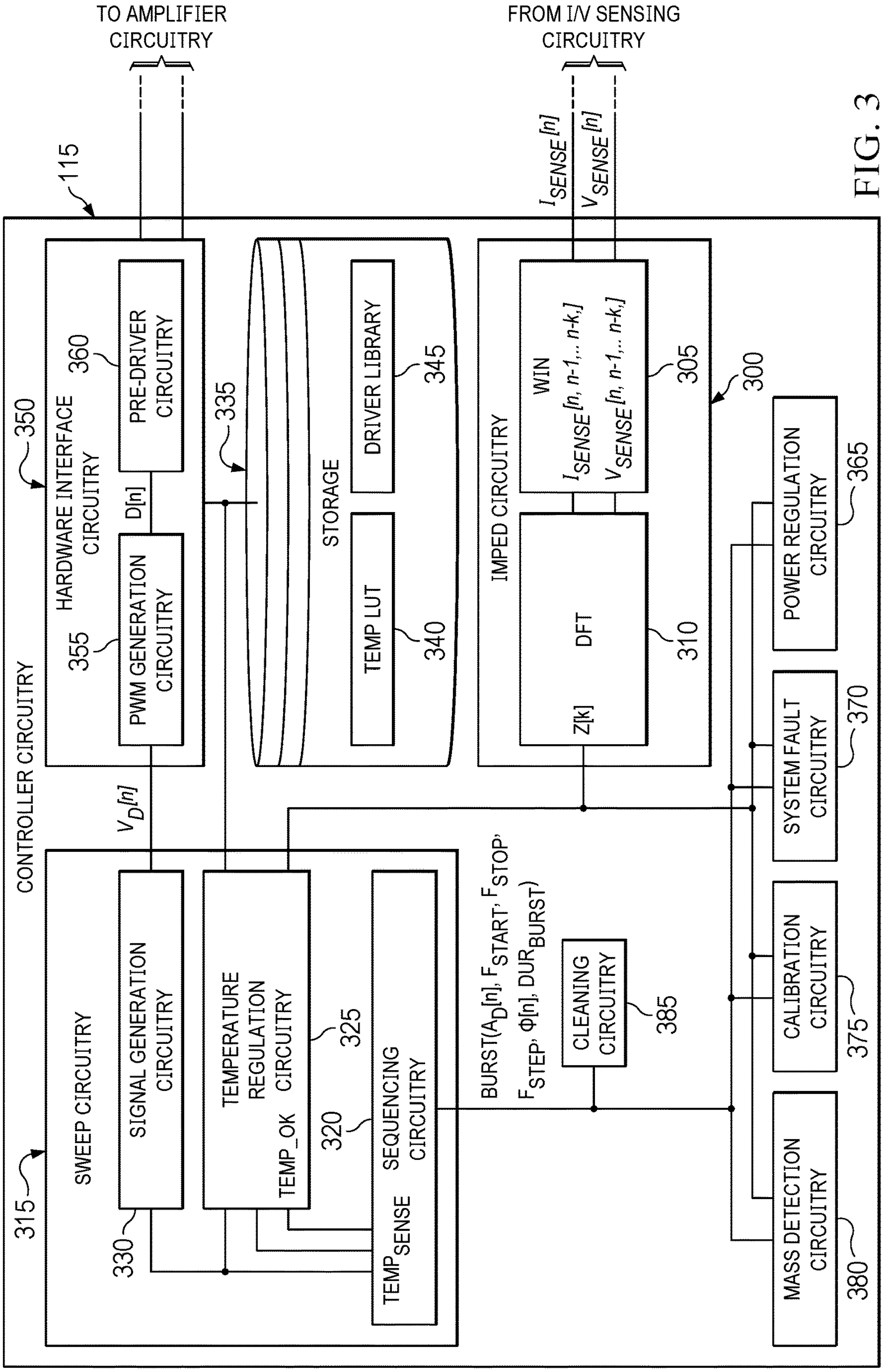
FIG. 3 is a block diagram of an example of the controller circuitry of FIG. 1 including example sweep circuitry to regulate a temperature of the transducer of FIG. 1.

FIG. 3 is a block diagram of an example implementation of the controller circuitry 115 of FIG. 1. The controller circuitry 115 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the controller circuitry 115 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The controller circuitry 115 has first and second inputs that may be coupled to the I/V sensing circuitry 135 of FIGS. 1 and 2. The controller circuitry 115 has first and second outputs that may be coupled to the amplifier circuitry 120 of FIGS. 1 and 2. In the example of FIG. 3, the controller circuitry 115 includes example impedance determination circuitry 300, example windowing (WIN) circuitry 305, example discrete Fourier transform (DFT) circuitry 310, example sweep circuitry 315, example sequencing circuitry 320, example temperature regulation circuitry 325, example signal generation circuitry 330, an example storage 335, an example temperature look-up table (LUT) 340, an example driver library 345, example hardware interface circuitry 350, example PWM generation circuitry 355, example pre-driver circuitry 360, example power regulation circuitry 365, example system fault circuitry 370, example calibration circuitry 375, example mass detection circuitry 380, and example cleaning circuitry 385. The controller circuitry 115 receives sense currents ($I_{SENSE}[n]$) and sense voltages ($V_{SENSE}[n]$) from the I/V sensing circuitry 135. The controller circuitry 115 generates a differential pair of pre-amplifier signals based on the sense currents and voltages. The regulator circuitry 105 of FIG. 1 supplies excitation signals to the lens cover system 110 of FIG. 1 responsive to the differential pair of pre-amplifier signals from the controller circuitry 115.

The impedance determination circuitry 300 has first and second inputs that may be coupled to the I/V sensing circuitry 135. The impedance determination circuitry 300 has an output coupled to the sweep circuitry 315, the temperature regulation circuitry 325, the power regulator circuitry 365, the system fault circuitry 370, the calibration circuitry 375, and the mass detection circuitry 380. In the example of FIG. 3, the impedance determination circuitry 300 includes the widowing circuitry 305 and the DFT circuitry 310. In some examples, the impedance determination circuitry 300 is instantiated by programmable circuitry executing impedance determination instructions and/or configured to perform operations such as those represented by the flowchart of FIG. 7A.

The windowing circuitry 305 has first and second inputs that may be coupled to the I/V sensing circuitry 135 and first and second outputs coupled to the DFT circuitry 310. The windowing circuitry 305 receives the sense current and voltage from the I/V sensing circuitry 135. In some examples, the windowing circuitry 305 includes analog-to-digital converters (ADCs) to convert analog voltage of the sense currents and voltages into digital values. In such examples, the digital outputs of the ADCs are in a discrete time, which represents sampling operations. The windowing circuitry 305 determines a plurality of values of the sense current and voltage ($I_{SENSE}[n, n-1, \ldots n-k]$ and $V_{SENSE}[n, n-1 \ldots n-k]$) by sampling the sense current and voltage. In some examples, the windowing circuitry 305 periodically samples the sense current and voltage ($I_{SENSE}[n]$ and $V_{SENSE}[n]$). In such examples, the windowing circuitry 305 stores a plurality of previous values of the sense current and voltage ($I_{SENSE}[n-1 \ldots n-k]$ and $V_{SENSE}[n-1 \ldots n-k]$). The windowing circuitry 305 stores the plurality of values of the sense current and voltage for a number of previous samples (k) before overwriting a sampled value. The windowing circuitry 305 supplies the plurality of values of the sense current and voltage to the DFT circuitry 310. In some examples, the windowing circuitry 305 is instantiated by programmable circuitry executing windowing instructions and/or configured to perform operations such as those represented by the flowchart of FIG. 7A.

The DFT circuitry 310 has first and second inputs coupled to the windowing circuitry 305 and an output coupled to the sweep circuitry 315, the temperature regulation circuitry 325, the power regulator circuitry 365, the system fault circuitry 370, the calibration circuitry 375, and the mass detection circuitry 380. The DFT circuitry 310 receives the plurality of values of the sense currents and voltages from the windowing circuitry 305. The DFT circuitry 310 generates a first DFT value that approximately represents the sense current at a given frequency and a second DFT value that approximately represents the sense voltage at a given frequency. In some examples, the DFT circuitry 310 converts the plurality of values of the sense current and voltage from a discrete time domain ([n]) to a complex frequency domain ([k]). Such an operation may be referred to as a Discrete Fourier Transform. In the complex frequency domain, the DFT circuitry 310 represents the sense currents and voltages using phases and magnitudes. In the example of FIG. 3, DFT circuitry 310 determines a frequency response representing an impedance (Z[k]) of lens cover system 110 to be approximately equal to the second DFT value divided by the first DFT value. For example, the impedance of the lens cover system 110 is approximately equal to the sense voltage divided by the sense current at a given time. The DFT circuitry 310 supplies the determined impedance (Z[k]) to the temperature regulation circuitry 325, the power regulator circuitry 365, the system fault circuitry 370, the calibration circuitry 375, and the mass detection circuitry 380. In some examples, the DFT circuitry 310 is instantiated by programmable circuitry executing DFT instructions and/or configured to perform operations such as those represented by the flowchart of FIG. 7A.

The sweep circuitry 315 has a first input coupled to the DFT circuitry 310, a second input coupled to the power regulator circuitry 365, the system fault circuitry 370, the calibration circuitry 375, the mass detection circuitry 380, and the cleaning circuitry 385. The sweep circuitry 315 has a third input coupled to the storage 335 and the hardware interface circuitry and an output coupled to the hardware interface circuitry 350 and the PWM generation circuitry 355. In the example of FIG. 3, the sweep circuitry 315 includes the sequencing circuitry 320, the temperature regulation circuitry 325, and the signal generation circuitry 330. The sweep circuitry 315 generates a chirp signal ($V_D$[n]) based on burst excitation information from one or more of the power regulator circuitry 365, the system fault circuitry 370, the calibration circuitry 375, the mass detection circuitry 380, and/or cleaning circuitry 385. The sweep circuitry 315 sequences generation of the chirp signal to regulate a temperature of the transducer 150 of FIG. 1. In some examples, the sweep circuitry 315 generates sub burst excitation information to allow the temperature regulation circuitry 325 to determine the temperature of the transducer 150. The sweep circuitry 315 supplies the chirp signal to the hardware interface circuitry 350. An example of the sweep circuitry 315 is further described in connection with FIG. 4, below. In some examples, the sweep circuitry 315 is instantiated by programmable circuitry executing sweep instructions and/or configured to perform operations such as those represented by the flowcharts of FIGS. 7A, 7B, 8.

The sequencing circuitry 320 has a first input coupled to the power regulator circuitry 365, the system fault circuitry 370, the calibration circuitry 375, and the mass detection circuitry 380 and a second input coupled to the temperature regulation circuitry 325. The sequencing circuitry 320 has a first output coupled to the signal generation circuitry 330 and a second output coupled to the temperature regulation circuitry 325. The sequencing circuitry 320 receives burst excitation information (BURST($A_D$[n], $F_{START}$, $F_{STOP}$, $F_{STEP}$, Φ[n], $DUR_{BURST}$)) from one or more of the power regulator circuitry 365, the system fault circuitry 370, the calibration circuitry 375, the mass detection circuitry 380, and/or the cleaning circuitry 385. In some examples, the sequencing circuitry 320 is instantiated by programmable circuitry executing sequencing instructions and/or configured to perform operations such as those represented by the flowcharts of FIGS. 7A, 7B, 8.

In the example of FIG. 3, burst excitation information includes information specifying an amplitude ($A_D$[n]), a start frequency ($F_{START}$), a stop frequency ($F_{STOP}$), a frequency step ($F_{STEP}$), an offset (Φ[n]), and a burst duration ($DUR_{BURST}$). The amplitude of the burst excitation information specifies an amplitude of the excitation signal represented by differential pair of excitation signals. The start frequency of the burst excitation information specifies a minimum frequency of the excitation signal. The stop frequency of the burst excitation information specifies a maximum frequency of the excitation signal. The start and stop frequencies form a range of frequencies of the excitation signal.

The frequency step of the burst excitation information specifies an interval between frequencies of the excitation signal. An excitation signal of a given instance of burst excitation information will be a sinusoidal signal with a varying frequency. During an example operation, the excitation signal will have a first frequency approximately equal to the start frequency for a first duration, a second frequency approximately equal to the start frequency plus the frequency step for a second duration. In such example operations, the final duration of the excitation signal corresponding to the burst excitation information will have a frequency approximately equal to the stop frequency.

The offset of the burst excitation information specifies a phase shift of the excitation signal. In some examples, the offset of the burst excitation information optimizes power transfer to the lens cover system 110. In such examples, the offset of the burst excitation information may modify a phase difference between power supplied to and power consumed by the lens cover system 110. Advantageously, reducing the phase difference between power supplied to and consumed by the lens cover system 110 increases the power efficiency of the regulator circuitry 105.

The burst duration of the burst excitation information specifies a duration of the excitation signal. In some examples, the sweep circuitry 315 determines a duration of each frequency step of the excitation signal based on the burst duration. In such examples, the sweep circuitry 315 determines the duration at each frequency to be approximately equal to burst duration divided by the number of frequencies of the range of frequencies over the frequency step.

The sequencing circuitry 320 generates a temperature sense indication ($TEMP_{SENSE}$) to initiate a temperature measurement. A temperature measurement includes halting a supply of the burst excitation information to allow the temperature regulation circuitry 325 to generate a temperature excitation signal to determine the temperature of the transducer 150. In some examples, the sequencing circuitry 320 periodically sets the temperature sense indication to measure the temperature after a temperature sense interval. In such examples, the sequencing circuitry 320 may need to separate a supply of the burst excitation information to allow for a temperature measurement.

The sequencing circuitry 320 separates the burst excitation information into a plurality of sub burst excitation information. The plurality of sub burst excitation information represents the information of the burst excitation information across a sequence of relatively shorter operations. The sequencing circuitry 320 supplies one of the plurality of sub burst excitation information to the signal generation circuitry 330 between temperature measurements of the temperature regulation circuitry 325. Advantageously, the sequencing circuitry 320 enables the temperature regulation circuitry 325 to regulate the temperature of the transducer 150 during a generation of an excitation signal corresponding to burst excitation information. Example generation of the sub burst excitation information is further described in connection with FIG. 4, below.

The sequencing circuitry 320 receives a temperature okay indication (TEMP_OK) from the temperature regulation circuitry 325 responsive to the temperature sense indication. The temperature okay indication indicates whether the temperature of the transducer 150 is low enough to continue generating excitations signals. When the temperature of the transducer 150 is not low enough to continue generating excitation signals, the sequencing circuitry 320 allows the transducer 150 to cooldown. During cooldown, the sequencing circuitry 320 prevents a supply sub burst excitation information to the signal generation circuitry 330. During cooldown, the sequencing circuitry 320 continues to set the temperature sense indication to initiate further temperature measurements. Once the temperature okay indication indicates the temperature of the transducer 150 is low enough to continue generating excitations signals the sequencing circuitry 320 begins supplying sub burst excitation information to the signal generation circuitry 330.

The temperature regulation circuitry 325 has a first input coupled to the sequencing circuitry 320, a second input coupled to the DFT circuitry 310, and a third input coupled to the storage 335. The temperature regulation circuitry 325 has a first output coupled to the sequencing circuitry 320 and a second output coupled to the sequencing circuitry 320 and the signal generation circuitry 330. The temperature regulation circuitry 325 receives the impedance of the transducer 150 and the temperature sense indication. The temperature regulation circuitry 325 determines the temperature of the lens cover system 110 responsive to the temperature sense indication.

In some examples, the temperature regulation circuitry 325 supplies temperature burst excitation information to the signal generation circuitry 330. The regulator circuitry 105 supplies a temperature sense excitation signal to the lens cover system 110 responsive to the temperature regulation circuitry 325 supplying the temperature burst excitation information to the signal generation circuitry 330. The temperature regulation circuitry 325 receives an impedance of the lens cover system 110 responsive to the temperature sense excitation signal from the DFT circuitry 310. The temperature regulation circuitry 325 determines the temperature of the lens cover system 110 responsive to comparing the impedance to values of the temperature LUT 340.

The temperature regulation circuitry 325 compares the determined temperature of the lens cover system 110 to a threshold temperature to generate the temperature okay indication. When the determined temperature is less than the threshold temperature, the temperature regulation circuitry 325 determines the lens cover system 110 is operating at a safe temperature (e.g., a temperature less than half of the Curie temperature of the transducer 150). When the determined temperature is greater than the threshold temperature, the temperature regulation circuitry 325 determines the lens cover system 110 is not operating at a safe temperature (e.g., a temperature greater than half of the Curie temperature of the transducer 150). The temperature regulation circuitry 325 supplies the temperature okay indication to the sequencing circuitry 320. An example of the temperature regulation circuitry 325 is described in FIG. 4 below. In some examples, the temperature regulation circuitry 325 is instantiated by programmable circuitry executing temperature regulation instructions and/or configured to perform operations such as those represented by the flowchart of FIGS. 7A, 7B.

The signal generation circuitry 330 has an input coupled to the sequencing circuitry 320 and the temperature regulation circuitry 325. The signal generation circuitry 330 receives excitation information from the sequencing circuitry 320 and/or the temperature regulation circuitry 325. The signal generation circuitry 330 generates the chirp signal responsive to the excitation information. The chirp signal is a discrete representation of a sinusoidal waveform having characteristics corresponding to the excitation information. In some examples, the signal generation circuitry 330 varies a frequency of the chirp signal based on the excitation information specifying a range of frequencies. The signal generation circuitry 330 supplies the chirp signal to the hardware interface circuitry 350 and the PWM generation circuitry 355. In some examples, the signal generation circuitry 330 is instantiated by programmable circuitry executing signal generation instructions and/or configured to perform operations such as those represented by the flowchart of FIGS. 7A, 7B.

The storage 335 is coupled to sweep circuitry 315, the temperature regulation circuitry 325 and the hardware interface circuitry 350. In the example of FIG. 3, the storage 335 includes the temperature LUT 340 and the driver library 345. The temperature LUT 340 includes data that specifies a temperature of the lens cover system 110 based on impedance. The temperature regulation circuitry 325 determines the temperature of the lens cover system 110 based on the values of the temperature LUT 340. The driver library 345 includes instructions and/or operations to configure and/or use hardware of the regulator circuitry 105. In some examples, the instructions and/or operations of the driver library 345 are performed using programmable circuitry. In such examples, executing and/or performing the instructions and/or operations of the driver library 345 may instantiate circuitry configured to perform one or more operations of the controller circuitry 115.

The hardware interface circuitry 350 has a first input coupled to the sweep circuitry 315 and the signal generation circuitry 330 and a second input coupled to the storage 335. The hardware interface circuitry 350 has first and second outputs that may be coupled to the amplifier circuitry 120. In the example of FIG. 3, the hardware interface circuitry 350 includes the PWM generation circuitry 355 and the pre-driver circuitry 360. The hardware interface circuitry 350 receives the chirp signal. The hardware interface circuitry 350 modulates the chirp signal to generate the differential pair of pre-amplifier signals. In some examples, the hardware interface circuitry 350 accesses the driver library 345 to interface with circuitry of the regulator circuitry 105. For example, the hardware interface circuitry 350 may instantiate the PWM generation circuitry 355 and/or the pre-driver circuitry 360 responsive to executing and/or performing instructions and/or operations of the driver library 345. The hardware interface circuitry 350 supplies the differential pair of pre-amplifier signals to the amplifier circuitry 120.

The PWM generation circuitry 355 has an input coupled to the sweep circuitry 315 and the signal generation circuitry 330 and an output coupled to the pre-driver circuitry 360. The PWM generation circuitry 355 receives the chirp signal. The PWM generation circuitry 355 generates a PWM chirp signal (D[n]) by modulating the chirp signal. The PWM generation circuitry 355 varies the duty cycle of the PWM chirp signal to represent different amplitudes of the chirp signal. In some examples, the PWM generation circuitry 355 generates the PWM chirp signal by comparing the chirp signal to a triangular waveform. In such examples, the PWM generation circuitry 355 increases the duty cycle of the PWM chirp signal to represent increases in the amplitude of the chirp signal and decreases the duty cycle of the PWM chirp signal to represent decreases in the amplitude of the chirp signal. Such an example is illustrated in FIG. 6 and described further below. The PWM generation circuitry 355 supplies the PWM chirp signal to the pre-driver circuitry 360. In some examples, the PWM generation circuitry 355 is instantiated by programmable circuitry executing PWM generation instructions and/or configured to perform operations such as those represented by the flowchart of FIGS. 7A, 7B.

The pre-driver circuitry 360 has an input coupled to the PWM generation circuitry 355 and first and second outputs that may be coupled to the amplifier circuitry 120. The pre-driver circuitry 360 receives the PWM chirp signal from the PWM generation circuitry 355. The pre-driver circuitry 360 converts the single ended PWM chirp signal into a differential pair of pre-amplifier signals. In some examples, the pre-driver circuitry 360 increases a signal strength (e.g., magnitude, drive strength, etc.) of the differential pair of pre-amplifier signals. In such examples, the pre-driver circuitry 360 configures the differential pair of pre-amplifier signals to be capable of controlling the transistors 204, 208, 216, 220 of FIG. 2. The pre-driver circuitry 360 supplies the differential pair of pre-amplifier signals to the amplifier circuitry 120. In some examples, the pre-driver circuitry 360 is instantiated by programmable circuitry executing pre-driver instructions and/or configured to perform operations such as those represented by the flowchart of FIGS. 7A, 7B.

The power regulation circuitry 365 has an input coupled to the DFT circuitry 310 and an output coupled to the sequencing circuitry 320. The power regulation circuitry 365 receives the impedance of the lens cover system 110 from the DFT circuitry 310. The power regulation circuitry 365 supplies power regulation excitation information to the sequencing circuitry 320. The power regulation excitation information is burst excitation information specific to operations of determining power being supplied to the lens cover system 110. The regulator circuitry 105 generates a power regulation excitation signal responsive to the power regulation excitation information. The power regulation circuitry 365 receives the impedance of the lens cover system 110 responsive to generating the power regulation excitation signal. The power regulation circuitry 365 determines the power efficiency of the supply of power to the lens cover system 110 based on the impedance and the characteristics of the power regulation excitation signal. In some examples, the power regulation circuitry 365 varies a phase and/or frequency of subsequent excitation information to modify power efficiency. In such examples, the power regulation circuitry 365 modifies the power efficiency to improve performance of the lens cover system 110. In some examples, the power regulation circuitry 365 is instantiated by programmable circuitry executing power regulation instructions.

The system fault circuitry 370 has an input coupled to the DFT circuitry 310 and an output coupled to the sequencing circuitry 320. The system fault circuitry 370 receives the impedance of the lens cover system 110 from the DFT circuitry 310. The system fault circuitry 370 supplies fault detection excitation information to the sequencing circuitry 320. The fault detection excitation information is burst excitation information specific to operations of detecting a fault in the system 100. The regulator circuitry 105 generates a fault detection excitation signal responsive to the fault detection excitation information. The system fault circuitry 370 receives the impedance of the lens cover system 110 responsive to generating the fault detection excitation signal. The system fault circuitry 370 detects a fault (e.g., mechanical failure, electrical short, malfunction) in the supply of power to the lens cover system 110 based on the impedance and the characteristics of the fault detection excitation signal. In some examples, system fault circuitry 370 prevents a supply of subsequent excitation information responsive to detecting a fault in the supply of power to the lens cover system 110. In some examples, the system fault circuitry 370 is instantiated by programmable circuitry executing system fault instructions.

The calibration circuitry 375 has an input coupled to the DFT circuitry 310 and an output coupled to the sequencing circuitry 320. The calibration circuitry 375 receives the impedance of the lens cover system 110 from the DFT circuitry 310. The calibration circuitry 375 supplies calibration excitation information to the sequencing circuitry 320. The calibration excitation information is burst excitation information specific to operations of calibrating the regulator circuitry 105. The regulator circuitry 105 generates a calibration excitation signal responsive to the calibration excitation information. The calibration circuitry 375 receives the impedance of the lens cover system 110 responsive to generating the calibration excitation signal. The calibration circuitry 375 determines characteristics of the excitation signal being generated based on the impedance and information of the calibration excitation information. In some examples, the calibration circuitry 375 varies an amplitude, a phase, and/or frequencies of subsequent excitation information to calibrate the controller circuitry 115. In such examples, the calibration circuitry 375 modifies generation of subsequent excitation signals to improve cleaning performance. In some examples, the calibration circuitry 375 is instantiated by programmable circuitry executing calibration instructions.

The mass detection circuitry 380 has an input coupled to the DFT circuitry 310 and an output coupled to the sequencing circuitry 320. The mass detection circuitry 380 receives the impedance of the lens cover system 110 from the DFT circuitry 310. The mass detection circuitry 380 supplies mass detection excitation information to the sequencing circuitry 320. The mass detection excitation information is burst excitation information specific to operations of detecting a change in mass on the lens cover 155 of FIG. 1, such as an addition of the contaminants 160 of FIG. 1. The regulator circuitry 105 generates a mass detection excitation signal responsive to the mass detection excitation information. The mass detection circuitry 380 receives the impedance of the lens cover system 110 responsive to generating the mass detection excitation signal. The mass detection circuitry 380 detects changes in a mass on the lens cover system 110 based on the impedance and the mass detection excitation information. In some examples, the mass detection circuitry 380 initiates a cleaning sequence responsive to detecting an increase in mass of the lens cover system 110. In some examples, the mass detection circuitry 380 is instantiated by programmable circuitry executing mass detection instructions.

The cleaning circuitry 385 has an output coupled to the sequencing circuitry 320. The cleaning circuitry 385 supplies cleaning excitation information to the sequencing circuitry 320. The cleaning excitation information is burst excitation information specific to operations of exciting the lens cover system 110 to remove the contaminants 160. The regulator circuitry 105 generates a cleaning excitation signal responsive to the cleaning excitation information. In some examples, the cleaning circuitry 385 periodically cleans the lens cover system 110. In other examples, the cleaning circuitry 385 cleans the lens cover system 110 responsive to an indication from the mass detection circuitry 380 and/or an indication from alternative circuitry. In some examples, the cleaning circuitry 385 is instantiated by programmable circuitry executing cleaning instructions.

Figure 4:
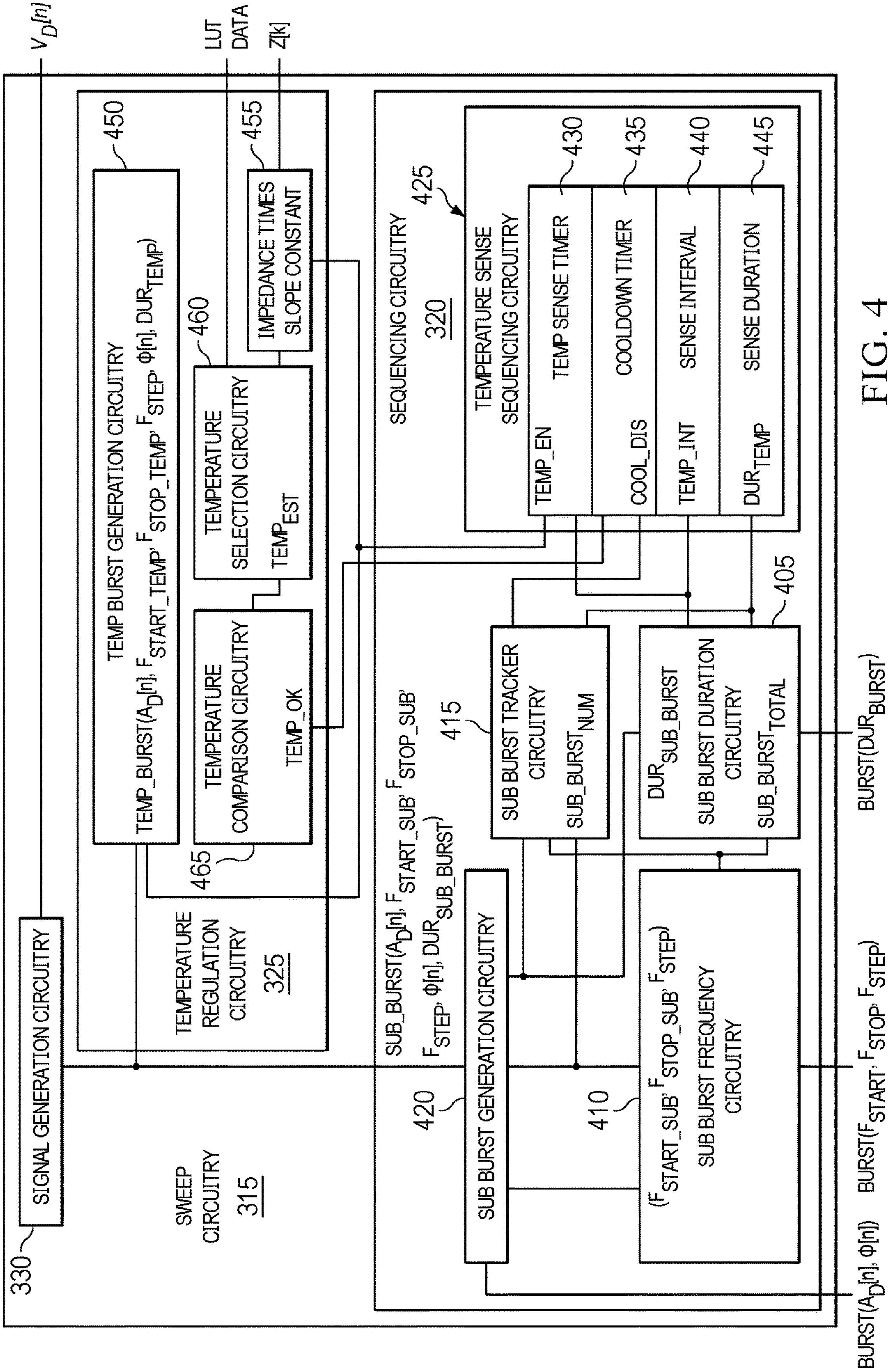
FIG. 4 is a block diagram of an example of the sweep circuitry of FIG. 3 including example sequencing circuitry, example temperature regulation circuitry, and example signal generation circuitry, the sweep circuitry to generate an excitation signal using burst excitation information and temperature excitation information.

FIG. 4 is a block diagram of an example implementation of the sweep circuitry 315 of FIG. 3 to regulate a temperature of the transducer 150 of FIG. 1. The sweep circuitry 315 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the sweep circuitry 315 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

FIG. 4 is a block diagram of an example of the sweep circuitry 315 of FIG. 3, the sequencing circuitry 320 of FIG. 3, and the temperature regulation circuitry 325 of FIG. 3. In the example of FIG. 4, the sequencing circuitry 320 includes example sub burst duration circuitry 405, example sub burst frequency circuitry 410, example sub burst tracker circuitry 415, example sub burst generation circuitry 420, example temperature sense sequencing circuitry 425, example temperature sense timer circuitry 430, example cooldown timer circuitry 435, an example sense interval value 440, and an example sense duration value 445. In the example of FIG. 4, the temperature regulation circuitry 325 includes example temperature burst generation circuitry 450, example multiplication circuitry 455, example temperature selection circuitry 460, and example temperature comparison circuitry 465.

The sub burst duration circuitry 405 has a first input that may be coupled to one or more of the circuitries 365, 370, 375, 380, 385 of FIG. 3, a second input coupled to the sense interval value 440, a third input coupled to the sense duration value 445. The sub burst duration circuitry 405 has first and second outputs coupled to the sub burst tracker circuitry 415 and the sub burst generation circuitry 420. The sub burst duration circuitry 405 receives the burst duration ($DUR_{BURST}$) of the burst excitation information, the sense interval value 440, and the sense duration value 445. The sub burst duration circuitry 405 determines an interval between temperature measurements ($TEMP_{INT}$) based on the sense interval value 440 and a duration of a temperature measurement ($DUR_{TEMP}$) based on the sense duration value 445. The sub burst duration circuitry 405 determines a maximum sub burst duration to be approximately equal to the interval between temperature measurements minus the duration of the temperature measurement.

The sub burst duration circuitry 405 determines a sub burst duration ($DUR_{SUB\_BURST}$) responsive to a comparison of the maximum sub burst duration to the burst duration. When the maximum sub burst duration is less than the burst duration, the sub burst duration circuitry 405 determines the sub burst duration to be approximately equal to the maximum sub burst duration. When the maximum sub burst duration is greater than the burst duration, the sub burst duration circuitry 405 determines the sub burst duration to be approximately equal to the burst duration. The sub burst duration circuitry 405 supplies the sub burst duration to the sub burst tracker circuitry 415 and the sub burst generation circuitry 420.

The sub burst duration circuitry 405 determines a total number of sub bursts value ($SUB\_BURST_{TOTAL}$) responsive to determining the sub burst duration. The total number of sub bursts value is approximately equal to a number of instances of sub burst excitation information needed to represent the burst duration of the burst excitation information. In some examples, the sub burst duration circuitry 405 determines the number of sub bursts value by dividing the burst duration by the sub burst duration. The sub burst duration circuitry 405 supplies the total number of sub bursts value to the sub burst frequency circuitry 410 and the sub burst tracker circuitry 415.

The sub burst frequency circuitry 410 has a first input that may be coupled to one or more of the circuitries 365, 370, 375, 380, 385, a second input coupled to the sub burst duration circuitry 405, and a third input coupled to the sub burst tracker circuitry 415. The sub burst frequency circuitry 410 has an output coupled to the sub burst generation circuitry 420. The sub burst frequency circuitry 410 receives the start frequency ($F_{START}$), the stop frequency ($F_{STOP}$), and the frequency step ($F_{STEP}$) of the burst excitation information. The sub burst frequency circuitry 410 receives the total number of sub bursts value and a sub burst index number ($SUB\_BURST_{NUM}$) from the sub burst tracker circuitry 415. The sub burst index number is an indexer value representing which sub burst of the total number of sub bursts is to be supplied to the signal generation circuitry 330. In some examples, the sub burst index number is a number between an initial value and the total number of sub bursts value.

The sub burst frequency circuitry 410 determines the range of frequencies for the burst excitation information to be the frequencies between the start and stop frequencies of the burst excitation information. The sub burst frequency circuitry 410 determines a total number of steps between start and stop frequencies by dividing the difference between the start and stop frequencies by the frequency step. The sub burst frequency circuitry 410 generates a sub burst start frequency ($F_{START\_SUB}$) and a sub burst stop frequency ($F_{STOP\_SUB}$) for each sub burst of the total number of sub bursts. The sub burst frequency circuitry 410 determines the sub burst start frequency to be a previous sub burst stop frequency plus the frequency step. In some examples, the sub burst start frequency corresponding to the first sub burst excitation information is approximately equal to the start frequency. The sub burst frequency circuitry 410 determines the sub burst stop frequency to be the sub burst start frequency plus the difference between the start and stop frequencies divided by the total number of sub burst value. In some examples, the sub burst stop frequency of the final sub burst is approximately equal to the stop frequency of the burst excitation information.

The sub burst frequency circuitry 410 supplies the sub burst start frequency, the sub burst stop frequency, and the frequency step to the sub burst generation circuitry 420 for each sub burst. In some examples, the sub burst frequency circuitry 410 redetermines the sub burst start and stop frequencies responsive to a change in the sub burst index number. In such examples, the change in the sub burst index number indicates a transition to a subsequent sub burst. Advantageously, the sub burst frequency circuitry 410 separates the range of frequencies of the burst excitation information into sub burst start and stop frequencies for each sub burst of the total number of sub bursts.

The sub burst tracker circuitry 415 has a first input coupled to the sub burst duration circuitry 405 and the sub burst generation circuitry 420, a second input coupled to the cooldown timer circuitry 435, and a third input coupled to the sense duration value 445. The sub burst tracker circuitry 415 has an output coupled to the sub burst frequency circuitry 410 and the sub burst generation circuitry 420. The sub burst tracker circuitry 415 receives the sub burst duration, a cooldown indication (COOL_DIS), and the sense duration value 445. The cooldown indication represents times when the transducer 150 of FIG. 1 needs to cool down. For example, the cooldown indication is set responsive to a detection of a temperature of the lens cover system 110 being greater than a threshold temperature.

The sub burst tracker circuitry 415 generates the sub burst index number to index the sub burst excitation information of the burst excitation information. The sub burst tracker circuitry 415 sets the sub burst index number to an initial value responsive to new burst excitation information being received. The sub burst tracker circuitry 415 modifies the sub burst index number based on the sub burst duration, the cooldown indication, and the sense duration value 445. The sub burst tracker circuitry 415 supplies the sub burst index number to the sub burst frequency circuitry 410 and the sub burst generation circuitry 420.

In example operation, the sub burst tracker circuitry 415 determines a time since a previous modification to the sub burst index number. In such an example operation, the sub burst tracker circuitry 415 modifies the sub burst index number responsive to the time being approximately equal to the sub burst duration plus the sense duration of the sense duration value 445. However, when the cooldown indication represents a cool down is needed, the sub burst tracker circuitry 415 holds the sub burst index number at the current value. In such operations, the sub burst tracker circuitry 415 may modify the sub burst index number after another sub burst duration and sense duration occur. During such operations, the sequencing circuitry 320 does not provide sub burst excitation information to the signal generation circuitry 330.

Advantageously, the cooldown indication prevents a supply of subsequent sub burst excitation information to the signal generation circuitry 330. Advantageously, the sub burst tracker circuitry 415 allows the cooldown indication to prevent generation of subsequent excitation signals. Advantageously, preventing generation of subsequent excitation signals allows the temperature of the lens cover system 110 to decrease.

The sub burst generation circuitry 420 has a first input that may be coupled to one or more of the circuitries 365, 370, 375, 380, 385, a second input coupled to the sub burst duration circuitry 405 and the sub burst tracker circuitry 415, a third input coupled to the sub burst frequency circuitry 410, and a fourth input coupled to the sub burst tracker circuitry 415. The sub burst generation circuitry 420 has an output coupled to the temperature regulation circuitry 325 and the signal generation circuitry 330. The sub burst generation circuitry 420 receives the amplitude, the phase, and the frequency step of the burst excitation information, the sub burst duration, the sub burst start and stop frequencies, and the sub burst index number. The sub burst generation circuitry 420 generates sub burst excitation information (SUB_BURST($A_D$[n]. $F_{START\_SUB}$, $F_{STOP\_SUB}$, $F_{STEP}$, $\Phi$[n], $DUR_{SUB\_BURST}$)) having the amplitude, the phase, and the frequency step of the burst excitation information, the sub burst duration, and the sub burst start and stop frequencies corresponding to the current sub burst index number. The sub burst generation circuitry 420 supplies the sub burst excitation information to the signal generation circuitry 330 responsive to a modification of the sub burst index number.

In example operations, the sub burst generation circuitry 420 generates sub burst excitation information specific to each value of the sub burst index number. In such example operations, the sub burst start and stop frequencies are specific to the value of the sub burst index number. The sub burst excitation information receives the sub burst start and stop frequencies for a given value of the sub burst index number from the sub burst frequency circuitry 410. In such examples, the sub burst generation circuitry 420 supplies the sub burst excitation information to the signal generation circuitry 330 responsive to receiving the sub burst start and stop frequencies for the modified value of the sub burst index number. In other examples, the sub burst generation circuitry 420 may store one or more instances of sub burst excitation information to supply as the value of the sub burst index number changes.

The temperature sense sequencing circuitry 425 is coupled to the sub burst duration circuitry 405, the sub burst tracker circuitry 415, the temperature burst generation circuitry 450, the multiplication circuitry 455, and the temperature comparison circuitry 465. In the example of FIG. 4, the temperature sense sequencing circuitry 425 includes the temperature sense timer circuitry 430, the cooldown timer circuitry 435, the sense interval value 440, and the sense duration value 445. The temperature sense sequencing circuitry 425 sequences temperature measurements. In the example of FIG. 4, the temperature sense sequencing circuitry 425 sequences temperature measurements periodically based on the sense interval value 440. Also, the temperature sense sequencing circuitry 425 implements sequences cooldown operations into the supply of sub burst excitation information.

The temperature sense timer circuitry 430 has an input coupled to the sense interval value 440 and an output coupled to the temperature burst generation circuitry 450 and the multiplication circuitry 455. The temperature sense timer circuitry generates a temperature sense indication (TEMP_EN) based on the sense interval value 440. The temperature sense indication initiates a temperature measurement. The temperature sense timer circuitry 430 periodically initiates a temperature measurement using the temperature sense indication. The temperature sense timer circuitry 430 sets an interval between temperature measurements based on the sense interval value 440. The temperature sense timer circuitry 430 supplies the temperature sense indication to the temperature burst generation circuitry 450 and the multiplication circuitry 455.

The cooldown timer circuitry 435 has an input coupled to the temperature comparison circuitry 465 and an output coupled to the sub burst tracker circuitry 415 and the temperature sense timer circuitry 430. The cooldown timer circuitry 435 receives a temperature okay indication (TEMP_OK) from the temperature comparison circuitry 465. The temperature okay indication represents a comparison of a determined temperature to a threshold temperature. When the temperature okay indication indicates that the determined temperature is greater than the threshold temperature, the cooldown timer circuitry 435 generates the cooldown indication to represent a cooldown is needed. The cooldown timer circuitry 435 holds the cooldown indication until the temperature okay indication indicates that a determined temperature of a subsequent temperature measurement is less than the threshold temperature. The cooldown timer circuitry 435 supplies the cooldown indication to the sub burst tracker circuitry 415.

The sense interval value 440 is coupled to the sub burst duration circuitry 405 and the temperature sense timer circuitry 430. The sense interval value 440 represents the interval between temperature measurements. In some examples, the sense interval value 440 is a register, memory location, etc.

The sense duration value 445 is coupled to the sub burst duration circuitry 405 and the sub burst tracker circuitry 415. The sense duration value 445 represents the duration of a temperature measurement. In some examples, the sense duration value 445 is a register, memory location, etc.

The temperature burst generation circuitry 450 has an input coupled to the temperature sense timer circuitry 430 and the multiplication circuitry 455 and an output coupled to the signal generation circuitry 330 and the sub burst generation circuitry 420. The temperature burst generation circuitry 450 receives the temperature sense indication. The temperature burst generation circuitry 450 supplies temperature burst excitation information (TEMP_BURST($A_D$[n], $F_{START\_TEMP}$, $F_{STOP\_TEMP}$, $F_{STEP}$, $\Phi$[n], $DUR_{TEMP}$) to the signal generation circuitry 330 responsive to the temperature sense indication indicating a temperature measurement. The temperature burst excitation information has information specifying an amplitude, a temperature start frequency, a temperature stop frequency, a frequency step, a phase, and the temperature sense duration. In some examples, the temperature start and stop frequencies are the same frequency. In such examples, the temperature burst excitation information may have a single frequency. The regulator circuitry 105 supplies a temperature excitation signal to the lens cover system 110 responsive to the temperature burst excitation information.

The multiplication circuitry 455 has a first input coupled to the temperature sense timer circuitry 430 and the temperature burst generation circuitry 450 and a second input that may be coupled to the DFT circuitry 310 of FIG. 3. The multiplication circuitry 455 has an output coupled to the temperature selection circuitry 460. The multiplication circuitry 455 receives the impedance of the transducer 150 of FIG. 1 from the DFT circuitry 310. The multiplication circuitry 455 determines the impedance of the transducer 150 responsive to supplying the temperature burst excitation information. The multiplication circuitry 455 multiplies the impedance by a slope constant to determine a temperature measurement value. In some examples, the multiplication circuitry 455 adds an offset value to the temperature measurement value. The offset value accounts for the material of the transducer 150. The multiplication circuitry 455 supplies the temperature measurement value to the temperature selection circuitry 460.

The temperature selection circuitry 460 has a first input coupled to the multiplication circuitry 455 and a second input that may be coupled to the storage 335 of FIG. 3. The temperature selection circuitry 460 has an output coupled to the temperature comparison circuitry 465. The temperature selection circuitry 460 receives the temperature measurement value and accesses possible temperature measurement values of the temperature LUT 340 of FIG. 3. The temperature selection circuitry 460 determines a temperature ($TEMP_{EST}$) of the transducer 150 to be approximately equal to a temperature corresponding to a possible temperature measurement value that is approximately equal to the determined temperature measurement value. In some examples, the temperature selection circuitry 460 may determine that the temperature of the possible temperature measurement value that is closest to the determined temperature measurement value. The temperature selection circuitry 460 supplies the determined temperature to the temperature comparison circuitry 465.

The temperature comparison circuitry 465 has an input coupled to the temperature selection circuitry 460 and an output coupled to the temperature comparison circuitry 465. The temperature comparison circuitry 465 receives the determined temperature of the transducer 150. The temperature comparison circuitry 465 generates the temperature okay indication responsive to a comparison of the determined temperature and the temperature threshold. In some examples, the temperature threshold is near and/or approximately equal to half of the Curie temperature of a piezo material of the transducer 150. In other examples, the temperature threshold is near and/or approximately equal to a fourth of the Curie temperature of the piezo material of the transducer 150 to further improve safety. In such examples, the temperature comparison circuitry 465 prevents the temperature of the transducer 150 from reaching temperatures that may depolarize the transducer 150.

Figure 5:
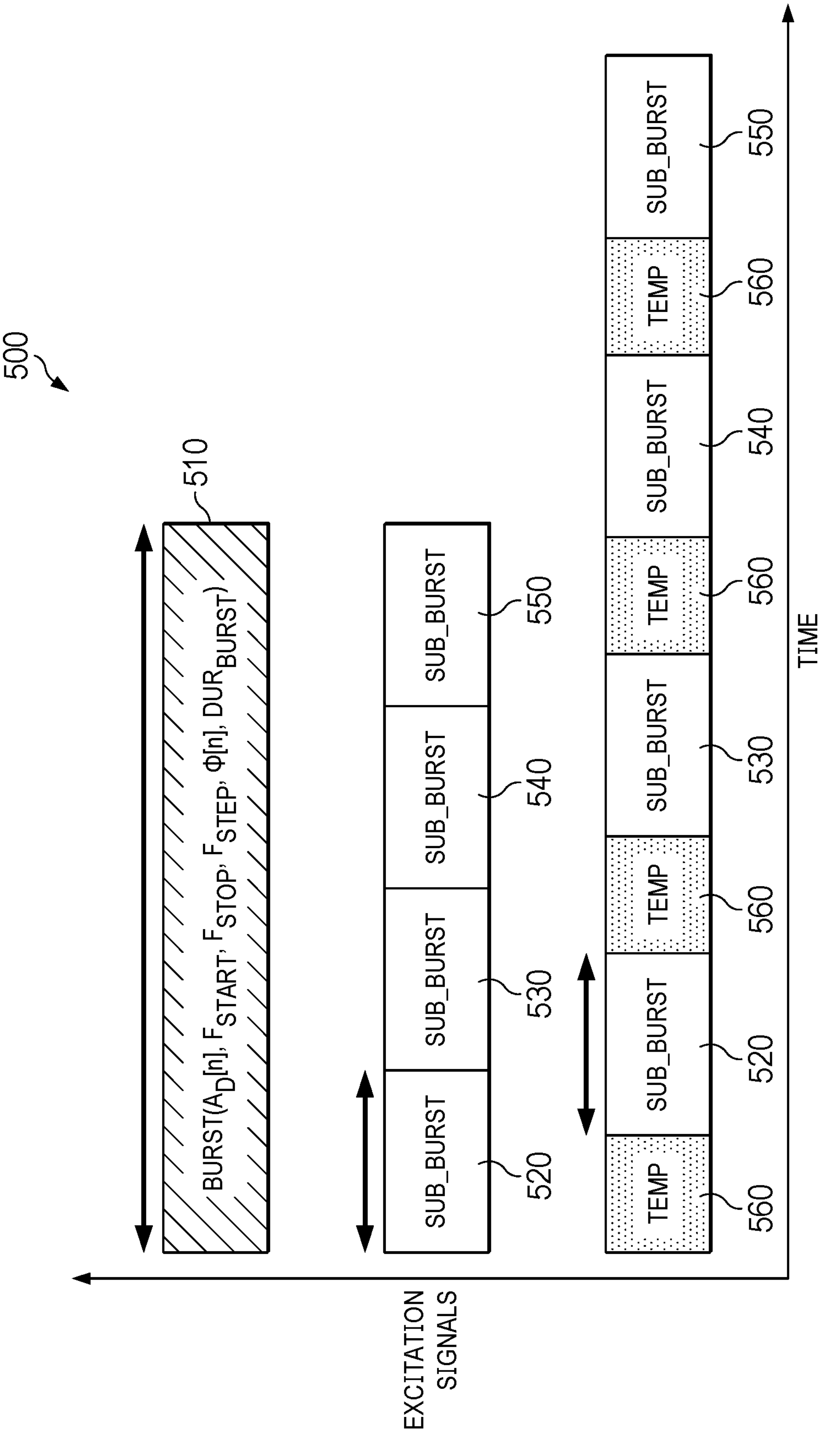
FIG. 5 is a timing diagram of example operations of the sweep circuitry of FIGS. 3 and 4 to regulate temperature of the transducer of FIG. 1.

FIG. 5 is an example timing diagram 500 of example operations where the sequencing circuitry 320 of FIG. 3 separates example burst excitation information 510 into first example sub burst excitation information 520, second example sub burst excitation information 530, third example sub burst excitation information 540, fourth example sub burst excitation information 550, and example temperature burst excitation information 560. In the example of FIG. 5, the timing diagram 500 illustrates example operations of the sweep circuitry 315 of FIGS. 3 and 4 to sequence temperature measurements with generation of an excitation signal corresponding to the burst excitation information 510.

The burst excitation information 510 has information specifying characteristics of an excitation signal. The circuitries 365, 370, 375, 380, 385 may generate the burst excitation information 510 to perform one or more operations. For example, the cleaning circuitry 385 may supply the burst excitation information 510 to generate the cleaning excitation signal. In such examples, the cleaning excitation signal excites the transducer 150 of FIG. 1, which removes the contaminants 160 of FIG. 1 from the lens cover 155 of FIG. 1. In another example the burst excitation information 510 may be generated as a part of one or more operations for power regulation, fault detection, calibration, mass detection, etc. The sequencing circuitry 320 of FIGS. 3 and 4 receives the burst excitation information 510.

The sequencing circuitry 320 generates the sub burst excitation information 520, 530, 540, 550 responsive to determining that the burst duration of the burst excitation information 510 is greater than the maximum sub burst duration. The maximum sub burst duration is approximately equal to an interval between temperature measurements minus a duration of the temperature measurement. When the burst duration is greater than the maximum sub burst duration, the sequencing circuitry separates the burst excitation information 510 into the sub burst excitation information 520, 530, 540, 550. Separating the burst excitation information 510 into the sub burst excitation information 520, 530, 540, 550 allows the temperature regulation circuitry 325 of FIGS. 3 and 4 to determine a temperature of the transducer 150 of FIG. 1.

The temperature burst excitation information 560 corresponds to generation of a temperature excitation signal. The temperature regulation circuitry 325 determines the temperature of the transducer 150 responsive to supplying the temperature excitation signal to the lens cover system 110 of FIG. 1. The sequencing circuitry 320 separates supplying the sub burst excitation information 520, 530, 540, 550 to the signal generation circuitry 330 of FIGS. 3 and 4 with the temperature burst excitation information 560. Advantageously, the temperature regulation circuitry 325 periodically checks the temperature of the transducer 150 between each of the sub burst excitation information 520, 530, 540, 550.

FIG. 6 are illustrative examples of waveforms generated by the regulator circuitry 105 of FIGS. 1, 2, 3, and 4. In the example of FIG. 6, the waveforms include an example triangular signal 610, an example chirp signal 620 ($V_D[n]$), a first example pre-amplifier signal 630, a second example pre-amplifier signal 640, and an example relatively higher power signal 650. The signals 610-650 are illustrative representations of signals generated by the regulator circuitry 105 over an example duration of time.

The PWM generation circuitry 355 of FIG. 3 generates the triangular signal 610 as a carrier signal. The PWM generation circuitry 355 uses the triangular signal 610 to modulate the chirp signal 620. The frequency of the triangular signal 610 may be referred to as the carrier frequency. The frequency of the triangular signal 610 may be modified to reduce even harmonics capable of distorting the modulated signal. The chirp signal 620 is generated by the signal generation circuitry 330 of FIGS. 3 and 4 responsive to excitation information from the sequencing circuitry 320 of FIGS. 3 and 4 or the temperature regulation circuitry 325 of FIGS. 3 and 4.

The hardware interface circuitry 350 of FIG. 3 generates the pre-amplifier signals 630, 640 by modulating the chirp signal 620 using the triangular signal 610. For example, the PWM generation circuitry 355 generates a PWM chirp signal by comparing the triangular signal 610 to the chirp signal 620. The pre-amplifier signals 630, 640 represent different amplitudes of the chirp signal 620 using a varying duty cycle. In such examples, pre-driver circuitry 360 of FIG. 3 generates the pre-amplifier signals 630, 640 by converting the single ended PWM chirp signal into a differential pair of signals. The pre-driver circuitry 360 may further modify the differential pair of signals to ensure that the pre-amplifier signals 630, 640 are capable of fully enabling and/or disabling transistors (e.g., the transistors 204, 208, 216, 220 of FIG. 2) of the amplifier circuitry 120 of FIGS. 1 and 2. The pre-amplifier signals 630, 640 form the differential pair of signals from the pre-driver circuitry 360.

The amplifier circuitry 120 generates the relatively higher power signal 650 responsive to the pre-amplifier signals 630, 640 controlling the transistors 204, 208, 216, 220. In some examples, the amplifier circuitry 120 generates the relatively higher power signal 650 as a differential pair of relatively higher power signals, such as in FIG. 2. The filter circuitry 125 of FIGS. 1 and 2 filters the varying duty cycle of the relatively higher power signal 650 to generate a sinusoidal excitation signal. The sinusoidal excitation signal of the filter circuitry 125 is a relatively higher power version of the chirp signal 620. Advantageously, modulating the chirp signal 620 to generate the pre-amplifier signals 630, 640 allows the amplifier circuitry 120 to be class B amplifier circuitry. Advantageously, using class B amplifier circuitry increases power efficiency by reducing linearly operating the transistors 204, 208, 216, 220. Alternatively, the regulator circuitry 105 may be modified to implement another type of amplifier circuitry, such as class A, class AB, etc. In such examples, the chirp signal 620 may be supplied directly to the amplifier circuitry 120.

Figure 7A:
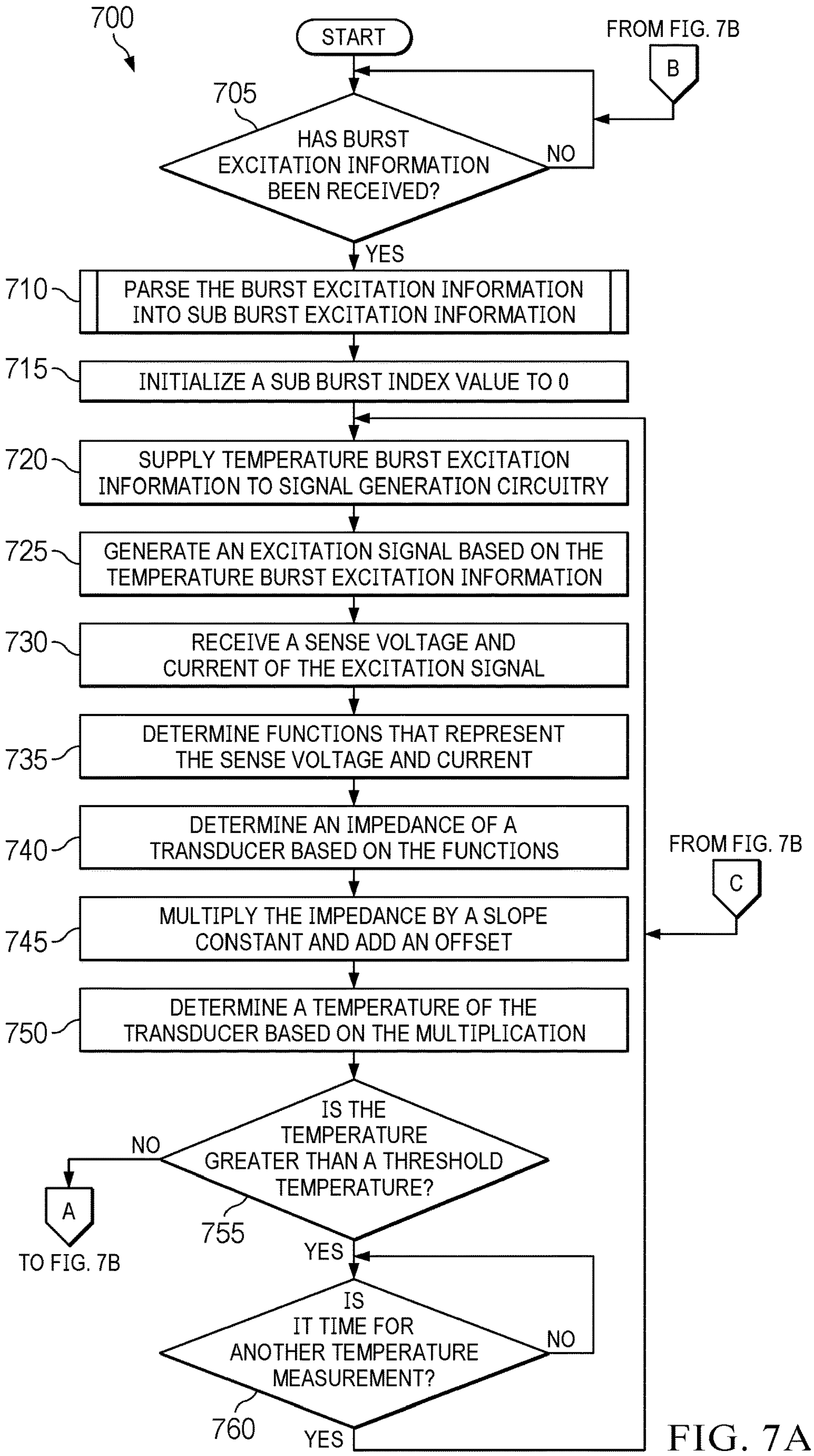
FIGS. 7A and 7B form a flowchart representative of example machine-readable instructions and/or example operations that may be executed, instantiated, and/or performed using an example programmable circuitry implementation of the sweep circuitry of FIGS. 3 and 4 and/or more generally the controller circuitry of FIGS. 1 and 3.
Figure 7B:
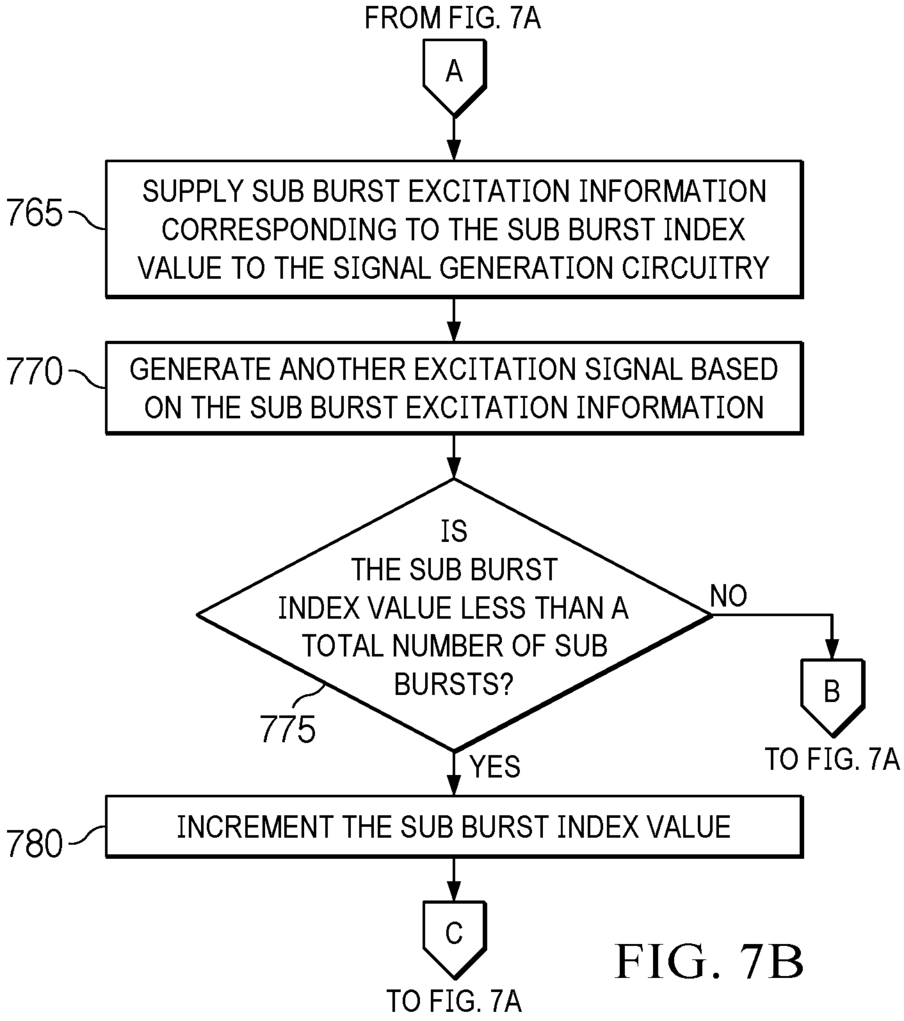

FIGS. 7A and 7B form a flowchart representative of example machine-readable instructions and/or example operations 700 that may be executed, instantiated, and/or performed using an example programmable circuitry implementation of the sweep circuitry 315 of FIGS. 3 and 4 and/or more generally the controller circuitry 115 of FIGS. 1 and 3. The example operations 700 begin at Block 705, at which the sequencing circuitry 320 of FIGS. 3 and 4 determines if burst excitation information has been received. In some examples, the circuitries 365, 370, 375, 380, 385 of FIG. 3 supply burst excitation information to the sequencing circuitry 320 to generate an excitation signal to perform an operation. For example, the cleaning circuitry 385 may supply burst excitation information to the sequencing circuitry to generate a cleaning excitation signal. In such examples, the cleaning excitation signal excites the transducer 150 of FIG. 1 to remove the contaminants 160 of FIG. 1. If the sequencing circuitry 320 does not receive burst excitation information (e.g., Block 705 returns a result of NO), control proceeds to return to Block 705.

If the sequencing circuitry 320 does receive burst excitation information (e.g., Block 705 returns a result of YES), the sequencing circuitry 320 parses the burst excitation information into sub burst excitation information. (Operations 710). In some examples, the circuitries 405, 410, 420 of FIG. 4 generate sub burst excitation information based on the burst excitation information. The Operations 710 are further described in connection with FIG. 8, below.

The sub burst tracker circuitry 415 initializes a sub burst index number to zero. (Block 715). In some examples, the sub burst tracker circuitry 415 sets the sub burst index number to an initial value responsive to the sequencing circuitry 320 receiving burst excitation information.

The temperature burst generation circuitry 450 of FIG. 4 supplies temperature burst excitation information to the signal generation circuitry 330 of FIGS. 3 and 4. (Block 720). In some examples, the temperature sense timer circuitry 430 sets the temperature sense indication to initiate a temperature measurement. In such examples, the temperature burst generation circuitry 450 supplies the temperature burst excitation information to the signal generation circuitry 330 to begin the temperature measurement.

The signal generation circuitry 330 generates an excitation signal based on the temperature burst excitation information. (Block 725). In some examples, the signal generation circuitry 330 generates a chirp signal based on the temperature burst excitation information. In such examples, the hardware interface circuitry 350 of FIG. 3 supplies a pre-amplifier signal to the amplifier circuitry 120 of FIGS. 1 and 2 responsive to the chirp signal. The amplifier circuitry 120 supplies a relatively higher power signal of the pre-amplifier signal to the filter circuitry 125, which causes a temperature excitation signal to be supplied to the lens cover system 110.

The impedance determination circuitry 300 of FIG. 3 receives a sense voltage and current of the excitation signal. (Block 730). In some examples, the I/V sensing circuitry 135 step down voltages of the temperature excitation signal and the sense resistor 130 of FIGS. 1 and 2 to generate sense currents and voltages. In such examples, the I/V sensing circuitry 135 supplies the sense currents and voltages of the temperature excitation signal to the windowing circuitry 305 of FIG. 3.

The DFT circuitry 310 of FIG. 3 determines functions that represent the sense voltage and current. (Block 735). In some examples, the DFT circuitry 310 receives a plurality of sense currents and voltages from the windowing circuitry 305. In such examples, the DFT circuitry 310 determines a first function representing the sense currents and a second voltage representing the sense voltages.

The DFT circuitry 310 determines an impedance of a transducer based on the functions. (Block 740). In some examples, the DFT circuitry 310 determines a transfer function by dividing the first and second functions. In such examples, the value of the transfer function is approximately equal to the impedance of the transducer 150 of FIG. 1.

The multiplication circuitry 455 of FIG. 4 multiplies the impedance by a slop constant and adds an offset. (Block 745). In some examples, the multiplication circuitry 455 determines a temperature measurement value specific to the material of the transducer 150 based on the determined impedance. In such examples, the offset and slop constant are determined based on the material of the transducer 150.

The temperature selection circuitry 460 of FIG. 4 determines a temperature of the transducer based on the multiplication. (Block 750). In some examples, the temperature selection circuitry 460 compares the temperature measurement value to possible temperature measurement values of the temperature LUT 340 of FIG. 3. In such examples, the temperature selection circuitry 460 determines the temperature of the transducer 150 to be approximately equal to the temperature of similar temperature measurement values of the possible temperature measurement values.

The temperature comparison circuitry 465 of FIG. 4 determines if the temperature is greater than a threshold temperature. (Block 755). In some examples, the temperature comparison circuitry 465 determines if the determined temperature is approaching temperatures that could depolarize the transducer 150. For example, the threshold temperature may be a temperature approximately equal to half the Curie temperature of the material of the transducer 150.

If the temperature comparison circuitry 465 determines the temperature is greater than the threshold temperature (e.g., Block 755 returns a result of YES), the temperature sense timer circuitry 430 of FIG. 4 determines if it is time for another temperature measurement. (Block 760). In some examples, the cooldown timer circuitry 435 of FIG. 4 sets the cooldown indication to prevent the sub burst tracker circuitry 415 from modifying the sub burst index number. In such examples, the cooldown indication remains set until a subsequent temperature measurement determines the temperature of the transducer to be less than the threshold temperature.

If the temperature sense timer circuitry 430 determines it is not time for another temperature measurement (e.g., Block 760 returns a result of NO), control proceeds to return to Block 760. In some examples, the sequencing circuitry 320 fails to provide sub burst excitation information to the signal generation circuitry 330 until a subsequent temperature measurement. If the temperature sense timer circuitry 430 determines it is time for another temperature measurement (e.g., Block 760 returns a result of YES), control proceeds to return to Block 720.

Turning now to FIG. 7B, if the temperature comparison circuitry 465 determines the temperature is not greater than the threshold temperature (e.g., Block 755 returns a result of NO), the sub burst generation circuitry 420 supplies sub burst excitation information corresponding to the sub burst index value to the signal generation circuitry 330. (Block 765). In some examples, the sub burst generation circuitry 420 generates sub burst excitation information with sub burst start and stop frequencies specific to the value of the sub burst index number. In such examples, the sub burst generation circuitry 420 supplies the sub burst excitation information to the signal generation circuitry 330 to cause generation of an excitation signal.

The signal generation circuitry 330 generates another excitation signal based on the sub burst excitation information. (Block 770). In some examples, the signal generation circuitry 330 generates a chirp signal based on the sub burst excitation information. In such examples, the hardware interface circuitry 350 supplies a pre-amplifier signal to the amplifier circuitry 120 responsive to the chirp signal. The amplifier circuitry 120 supplies a relatively higher power signal of the pre-amplifier signal to the filter circuitry 125, which causes an excitation signal to be supplied to the lens cover system 110.

The sub burst tracker circuitry 415 determines if the sub burst index value is less than a total number of sub bursts. (Block 775). In some examples, the sub burst tracker circuitry 415 stops modifying the sub burst index number responsive to the sub burst index number being equal to the total number of sub bursts. If the sub burst tracker circuitry 415 determines the sub burst index value is not less than a total number of sub bursts (e.g., Block 775 returns a result of NO), control proceeds to return to Block 705 of FIG. 7A.

If the sub burst tracker circuitry 415 determines the sub burst index value is less than a total number of sub bursts (e.g., Block 775 returns a result of YES), the sub burst tracker circuitry 415 increments the sub burst index value. (Block 780). In some examples, the sub burst tracker circuitry 415 determines that there are still sub bursts of the total number of sub bursts that need to be supplied. In such examples, the sub burst tracker circuitry 415 may modify the sub burst index number to proceed to a subsequent sub burst. Control proceeds to return to Block 720 of FIG. 7A.

Although example methods are described with reference to the flowchart illustrated in FIGS. 7A and 7B, many other methods of implementing the sweep circuitry 315 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8:
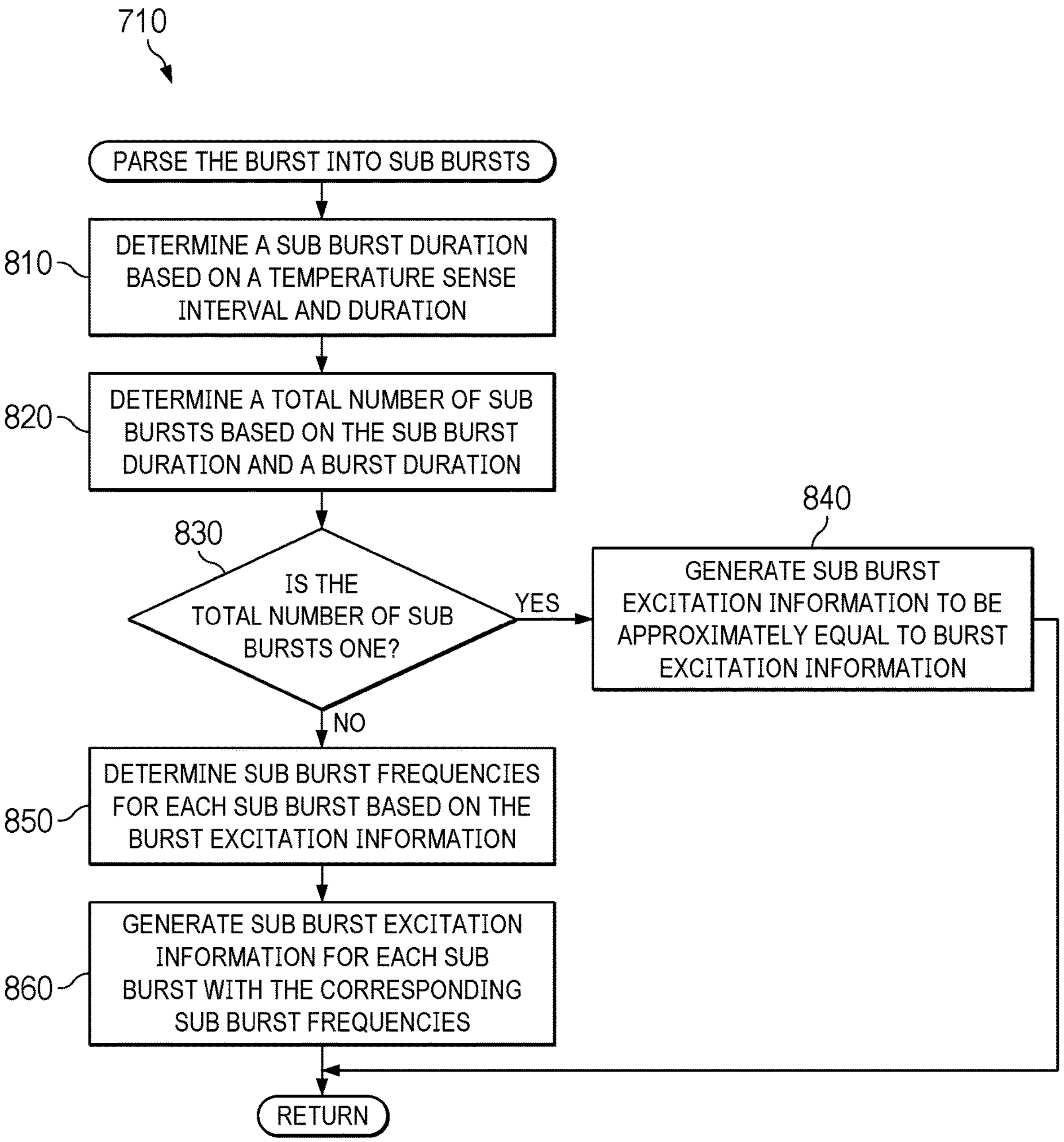
FIG. 8 is a flowchart representative of example machine-readable instructions and/or example operations that may be executed, instantiated, and/or performed using an example programmable circuitry implementation of the sweep circuitry of FIGS. 3 and 4.

FIG. 8 is a flowchart representative of example machine-readable instructions and/or example operations 710 of FIG. 7A that may be executed, instantiated, and/or performed using an example programmable circuitry implementation of the sequencing circuitry 320 of FIGS. 3 and 4 and/or more generally the sweep circuitry 315 of FIGS. 3 and 4. The example operations 710 begin at Block 810, at which the sub burst duration circuitry 405 determines a sub burst duration based on a temperature sense interval and duration. (Block 810). In some examples, the sub burst duration circuitry 405 determines the maximum sub burst duration by subtracting the temperature sense duration from the temperature sense interval. In such examples, the sub burst duration circuitry 405 determines the sub burst duration to be equal to the maximum sub burst duration when the burst duration is greater than the maximum sub burst duration. In other examples, the sub burst duration circuitry 405 determines the sub burst duration to be equal to the burst duration responsive to the burst duration being less than the maximum sub burst duration.

The sub burst duration circuitry 405 determines a total number of sub bursts based on the sub burst duration and a burst duration. (Block 820). In some examples, the sub burst duration circuitry 405 determines the total number of sub bursts by dividing the burst duration by the sub burst duration.

The sub burst duration circuitry 405 determines if the total number of sub bursts is one. (Block 830). In some examples, the sub burst duration circuitry 405 determines if the sequencing circuitry 320 needs to separate the burst excitation information into a plurality of sub burst excitation information. If the total number of sub bursts is one, then the sub burst duration is approximately equal to the burst duration and there is no need to generate sub bursts.

If the sub burst duration circuitry 405 determines the total number of sub bursts is one (e.g., Block 830 returns a result of YES), the sub burst generation circuitry 420 of FIG. 4 generates sub burst excitation information approximately equal to the burst excitation information. (Block 840). If the total number of sub bursts is one, then the sub burst duration is approximately equal to the burst duration and there is no need to generate sub bursts. In such examples, the sub burst excitation information is approximately equal to the burst excitation information. Control proceeds to return.

If the sub burst duration circuitry 405 determines the total number of sub bursts is not one (e.g., Block 830 returns a result of NO), the sub burst frequency circuitry 410 of FIG. 4 determines sub burst frequencies for each sub burst based on the burst excitation information. (Block 850). In some examples, the sub burst frequency circuitry 410 divides a range of frequencies of the burst excitation information by the frequency step to determine a total number of frequencies of the burst excitation information. In such examples, the sub burst frequency circuitry 410 divides the total number of frequencies between the total number of sub bursts.

The sub burst generation circuitry 420 generates sub burst excitation information for each sub burst with the corresponding sub burst frequencies. (Block 860). In some examples, the sub burst generation circuitry 420 generates sub burst excitation information for each sub burst of the total number of sub bursts based on information of the burst excitation information and the frequencies of the sub burst frequency circuitry 410. Control proceeds to return.

Although example methods are described with reference to the flowchart illustrated in FIG. 8, many other methods of implementing the sequencing circuitry 320 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Flowchart(s) representative of example machine-readable instructions, which may be executed, to cause programmable circuitry to implement and/or instantiate the controller circuitry 115 of FIGS. 1, 3, 4 and/or representative of example operations which may be performed by programmable circuitry to implement and/or instantiate the controller circuitry 115 of FIGS. 1, 3, 4, are shown in FIGS. 7A, 7B, 8. The machine-readable instructions may be one or more executable programs or portion(s) of one or more executable programs for execution by programmable circuitry such as the programmable circuitry 912 shown in the example processor platform 900 discussed below in connection with FIG. 9 and/or may be one or more function(s) or portion(s) of functions to be performed by the example programmable circuitry (e.g., an FPGA) discussed below in connection with FIGS. 10 and/or 11. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7A, 7B, 8, many other methods of implementing the example controller circuitry 115 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7A, 7B, 8 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 9:
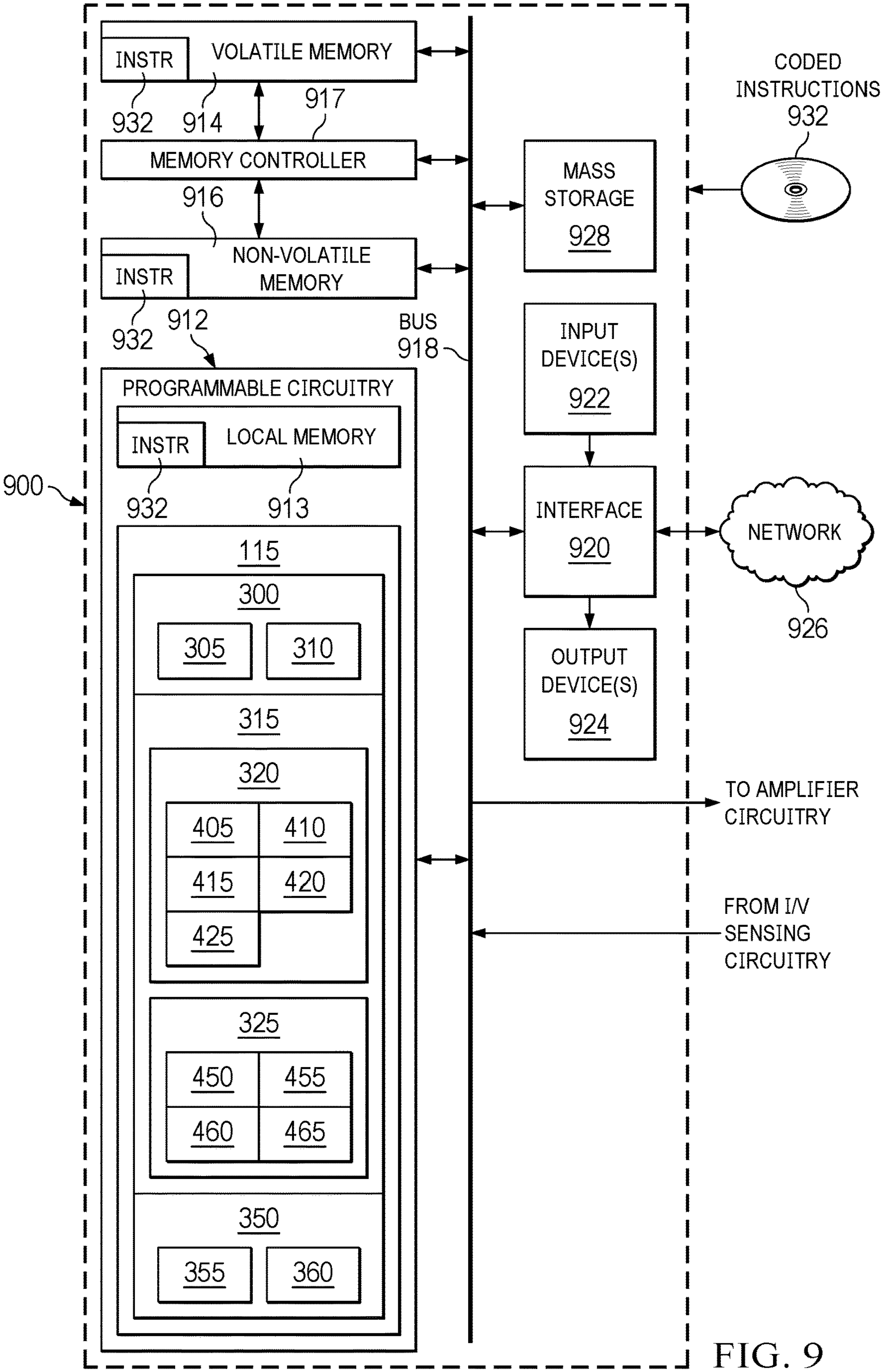
FIG. 9 is a block diagram of an example processing platform including programmable circuitry structured to execute, instantiate, and/or perform the example machine-readable instructions and/or perform the example operations of FIGS. 7A, 7B, and 8 to implement the controller circuitry of FIGS. 1, 3, and 4.

FIG. 9 is a block diagram of an example programmable circuitry platform 900 structured to execute and/or instantiate the example machine-readable instructions and/or the example operations of FIGS. 7A, 7B, 8 to implement the controller circuitry 115 of FIGS. 1, 3, 4. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the circuitries 300, 305, 310, 315, 320, 325, 330, 350, 355, 360, 365, 370, 375, 380, 385 of FIGS. 3 and 4, the circuitries 405, 410, 415, 420, 425, 430, 435, 450, 455, 460, 465 of FIG. 4, and/or more generally the controller circuitry 115 of FIGS. 1 and 3.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 932, which may be implemented by the machine-readable instructions of FIGS. 7A, 7B, 8, may be stored in the mass storage device 928, in the volatile memory 914, in the non-volatile memory 916, and/or on at least one non-transitory computer readable storage medium such as a CD or DVD which may be removable.

Figure 10:
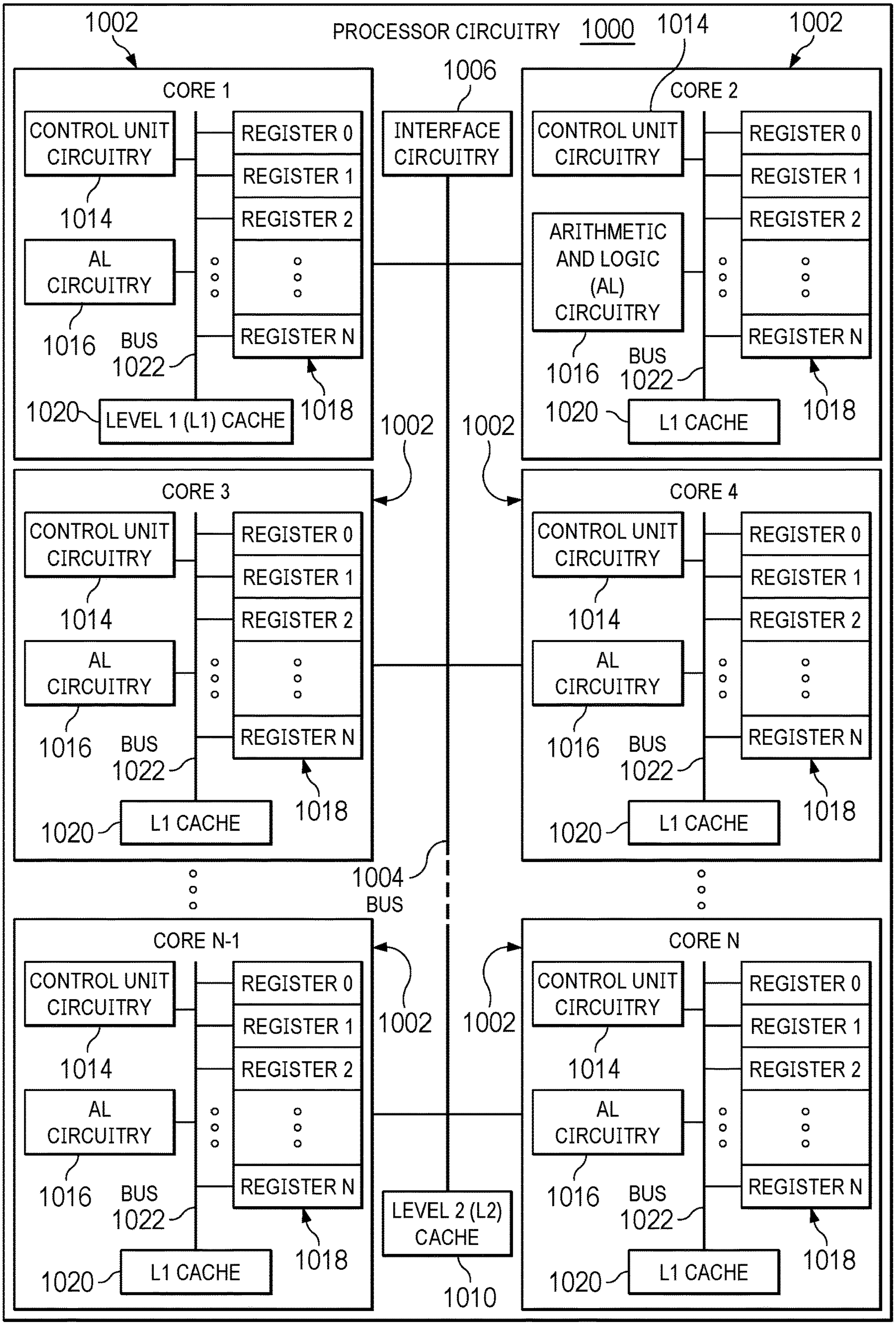
FIG. 10 is a block diagram of an example implementation for the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 7A, 7B, 8 to effectively instantiate the circuitry of FIG. 2 as logic circuits to perform operations corresponding to those machine-readable instructions. In some such examples, the circuitry of FIGS. 1, 3, 4 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 7A, 7B, 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer-based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
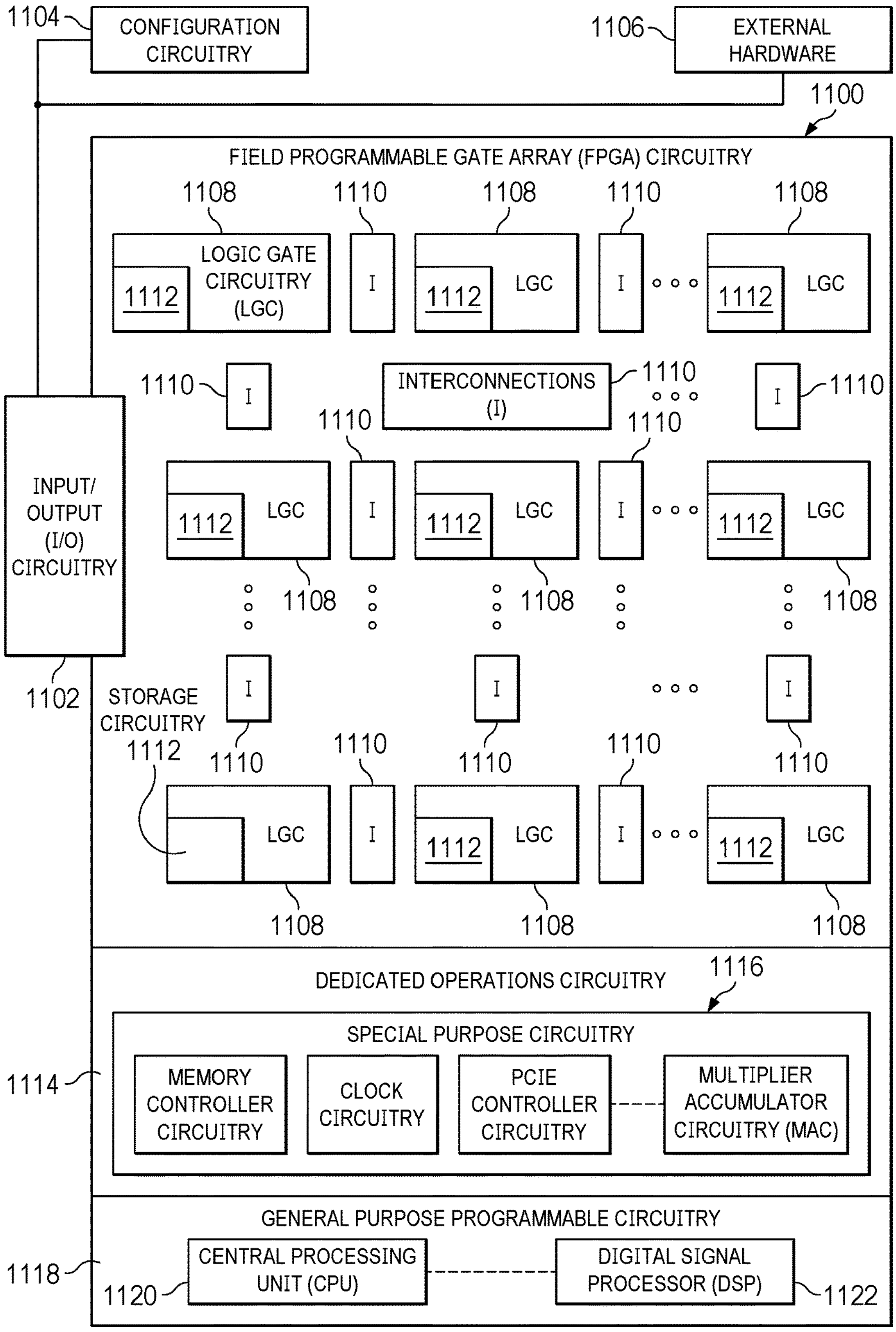
FIG. 11 is a block diagram of another example implementation for the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine-readable instructions represented by the flowchart(s) of FIGS. 7A, 7B, 8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 7A, 7B, 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7A, 7B, 8. As such, the FPGA circuitry 1100 may be configured and/or structured to effectively instantiate some or all of the operations/functions corresponding to the machine-readable instructions of the flowchart(s) of FIGS. 7A, 7B, 8 as dedicated logic circuits to perform the operations/functions corresponding to those software instructions in a dedicated manner analogous to an ASIC. Therefore, the FPGA circuitry 1100 may perform the operations/functions corresponding to the some or all of the machine-readable instructions of FIGS. 7A, 7B, 8 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine-readable instructions of FIGS. 7A, 7B, 8 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine-readable instructions represented by the flowchart(s) of FIGS. 7A, 7B, 8 to perform first operation(s)/function(s), the FPGA circuitry 1100 of FIG. 11 may be configured and/or structured to perform second operation(s)/function(s) corresponding to a second portion of the machine-readable instructions represented by the flowcharts of FIG. 7A, 7B, 8, and/or an ASIC may be configured and/or structured to perform third operation(s)/function(s) corresponding to a third portion of the machine-readable instructions represented by the flowcharts of FIGS. 7A, 7B, 8.

It should be understood that some or all of the circuitry of FIGS. 1, 3, 4 may, thus, be instantiated at the same or different times. For example, the same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIGS. 1, 3, 4 may be instantiated, for example, in one or more threads executing concurrently and/or in series. For example, the microprocessor 1000 of FIG. 10 may execute machine-readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIGS. 1, 3, 4 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG.

11) in another package, a GPU in yet another package, and an FPGA (e.g., the FPGA circuitry 1100 of FIG. 11) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A. (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A. (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

In this description, the term "and/or" (when used in a form such as A, B and/or C) refers to any combination or subset of A, B, C, such as: (a) A alone; (b) B alone; (c) C alone; (d) A with B; (c) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:

machine-readable instructions; and programmable circuitry configured to at least one of instantiate or execute the machine-readable instructions to:

receive burst excitation information including a burst start frequency, a burst stop frequency, and a burst duration, the burst start frequency and the burst stop frequency defining a range of frequencies of the burst excitation information;

generate first and second sub burst excitation information based on the burst excitation information, the first and second sub burst excitation information having a sub burst duration based on a difference between a temperature sense interval and a temperature sense duration, the temperature sense interval being a time between temperature measurements, the temperature sense duration being a duration specified by temperature burst excitation information; and generate an excitation signal responsive to the first sub burst excitation information, the second sub burst excitation information, and the temperature burst excitation information, the excitation signal having frequencies of the range of frequencies of the burst excitation information.

2. The apparatus of claim 1, wherein the programmable circuitry is configured to:

generate the temperature burst excitation information including a temperature start frequency, a temperature stop frequency, and the temperature sense duration; and generate the excitation signal responsive to the first and second sub burst excitation information and the temperature burst excitation information, the excitation signal having a first portion and a second portion, the first portion responsive to the temperature burst excitation information, the second portion responsive to the first sub burst excitation information.

3. The apparatus of claim 2, wherein the excitation signal further having a third portion and a fourth portion, the third portion responsive to the temperature burst excitation information, the programmable circuitry is configured to:

determine a temperature of a transducer responsive to the third portion of the excitation signal;

generate the fourth portion of the excitation signal using the second sub burst excitation information responsive to the temperature of the transducer being less than a threshold; and generate the fourth portion of the excitation signal using the temperature burst excitation information after a cool down duration responsive to the temperature of the transducer being greater than the threshold.

4. The apparatus of claim 1, wherein the programmable circuitry is configured to:

generate the temperature burst excitation information including the temperature sense duration;

generate the excitation signal responsive to the temperature burst excitation information;

receive currents and voltages of the excitation signal responsive to the temperature burst excitation information; and determine a Fourier Transform responsive to the currents and voltages of the excitation signal.

5. The apparatus of claim 4, wherein the programmable circuitry is configured to:

determine an impedance of a transducer that receives the excitation signal responsive to the Fourier Transform;

generate a temperature measurement value as a multiplication of the impedance by a slope constant;

add an offset value to the temperature measurement value, the offset value based on a material of the transducer; and compare the temperature measurement value to possible temperature measurement values to determine a temperature of the transducer.

6. The apparatus of claim 1, wherein the burst excitation information further includes a frequency step to specify intervals between the frequency of the excitation signal between the burst start frequency and the burst stop frequency, and the first sub burst excitation information further including the frequency step, a sub burst start frequency, and a sub burst stop frequency, the sub burst start frequency and the sub burst stop frequency are between or equal to the burst start frequency and the burst stop frequency.

7. At least one non-transitory computer readable storage medium comprising instructions that, when executed, cause programmable circuitry to at least:

receive burst excitation information including a burst start frequency, a burst stop frequency, and a burst duration, the burst start frequency and the burst stop frequency defining a range of frequencies of the burst excitation information;

generate first and second sub burst excitation information based on the burst excitation information, the first and second sub burst excitation information having a sub burst duration based on a difference between a temperature sense interval and a temperature sense duration, the temperature sense interval being a time between temperature measurements, the temperature sense duration being a duration specified by temperature burst excitation information; and generate an excitation signal responsive to the first sub burst excitation information, the second sub burst excitation information, and the temperature burst excitation information, the excitation signal having frequencies of the range of frequencies of the burst excitation information.

8. The at least one non-transitory computer readable storage medium of claim 7, wherein the instructions are to cause the programmable circuitry to:

generate the temperature burst excitation information including a temperature start frequency, a temperature stop frequency, and the temperature sense duration; and generate the excitation signal responsive to the first and second sub burst excitation information and the temperature burst excitation information, the excitation signal having a first portion and a second portion, the first portion responsive to the temperature burst excitation information, the second portion responsive to the first sub burst excitation information.

9. The at least one non-transitory computer readable storage medium of claim 8, wherein the excitation signal further having a third portion and a fourth portion, the third portion responsive to the temperature burst excitation information, and the instructions are to cause the programmable circuitry to:

determine a temperature of a transducer responsive to the third portion of the excitation signal;

generate the fourth portion of the excitation signal using the second sub burst excitation information responsive to the temperature of the transducer being less than a threshold; and generate the fourth portion of the excitation signal using the temperature burst excitation information after a cool down duration responsive to the temperature of the transducer being greater than the threshold.

10. The at least one non-transitory computer readable storage medium of claim 7, wherein the instructions are to cause the programmable circuitry to:

generate the temperature burst excitation information including a temperature start frequency, a temperature stop frequency, and the temperature sense duration;

generate the excitation signal responsive to the temperature burst excitation information;

receive currents and voltages of the excitation signal responsive to the temperature burst excitation information; and determine a Fourier Transform responsive to the currents and voltages of the excitation signal.

11. The at least one non-transitory computer readable storage medium of claim 10, wherein the instructions are to cause the programmable circuitry to:

determine an impedance of a transducer that receives the excitation signal responsive to the Fourier Transform;

generate a temperature measurement value as a multiplication of the impedance by a slope constant;

add an offset value to the temperature measurement value, the offset value based on a material of the transducer; and compare the temperature measurement value to possible temperature measurement values to determine a temperature of the transducer.

12. The at least one non-transitory computer readable storage medium of claim 7, wherein the burst excitation information further includes a frequency step to specify intervals between the frequency of the excitation signal between the burst start frequency and the burst stop frequency, and the first sub burst excitation information further including the frequency step, a sub burst start frequency, and a sub burst stop frequency, the sub burst start frequency and the sub burst stop frequency are between or equal to the burst start frequency and the burst stop frequency.

13. An apparatus comprising:

temperature regulation circuitry configured to:

generate temperature burst excitation information having a temperature sense duration;

sequencing circuitry configured to:

receive burst excitation information including a burst start frequency and a burst stop frequency; and generate first and second sub burst excitation information based on the burst excitation information, the first and second sub burst excitation information including a sub burst start frequency, a sub burst stop frequency, and a sub burst duration, the sub burst start and stop frequencies to define a range of frequencies, the sub burst duration based on a difference between a temperature sense interval and the temperature sense duration; and signal generation circuitry configured to:

generate an excitation signal responsive to the temperature burst excitation information, the first sub burst excitation information, and the second sub burst excitation information, the first and second sub burst excitation information to modify a frequency of the excitation signal to frequencies of the range of frequencies.

14. The apparatus of claim 13, wherein the signal generation circuitry is further configured to:

generate a first portion of the excitation signal responsive to the temperature burst excitation information;

generate a second portion of the excitation signal responsive to the first sub burst excitation information;

generate a third portion of the excitation signal responsive to the temperature burst excitation information; and generate a fourth portion of the excitation signal responsive to the second sub burst excitation information.

15. The apparatus of claim 14, wherein the temperature regulation circuitry is further configured to:

determine a temperature of a transducer responsive to the first and third portions of the excitation signal; and compare the temperature to a temperature threshold to determine if a cooldown is needed.

16. The apparatus of claim 13, further including impedance determination circuitry configured to:

receive currents and voltages of the excitation signal responsive to the temperature burst excitation information;

determine a Fourier Transform responsive to the currents and voltages of the excitation signal; and determine an impedance of a transducer that receives the excitation signal responsive to the Fourier Transform.

17. The apparatus of claim 16, wherein the temperature regulation circuitry is configured to:

generate a temperature measurement value as a multiplication of the impedance by a slope constant;

add an offset value to the temperature measurement value, the offset value based on a material of the transducer; and compare the temperature measurement value to possible temperature measurement values to determine a temperature of the transducer.

18. The apparatus of claim 13, wherein the burst excitation information further includes a frequency step to specify intervals between the frequency of the excitation signal between the burst start frequency and the burst stop frequency, and the first sub burst excitation information further including the frequency step, a sub burst start frequency, and a sub burst stop frequency, the sub burst start frequency and the sub burst stop frequency are between or equal to the burst start frequency and the burst stop frequency.

19. The apparatus of claim 13, wherein the sequencing circuitry is further configured to determine a sub burst duration of the first and second sub burst excitation information based on a temperature sense interval and a temperature sense duration, the temperature sense interval being a time between temperature measurements, the temperature sense duration being a time of a temperature measurement.

* * * * *